(12) United States Patent  
Cole

(10) Patent No.: US 6,538,564 B1
(45) Date of Patent: Mar. 25, 2003

(54) MULTIPLE TAG READING SYSTEM

(75) Inventor: Peter Harold Cole, West Lake Shore (AU)

(73) Assignee: Integrated Silicon Design PTY LTD, Adelaide (AU)

(*) Notice: Subject to any disclaimer, the term of this patent is extended or adjusted under 35 U.S.C. 154(b) by 0 days.

(21) Appl. No.: 09/319,987

(22) PCT Filed: Jan. 16, 1998

(86) PCT No.: PCT/AU98/00017

§ 371 (c)(1),
(2), (4) Date: Jun. 15, 1999

(87) PCT Pub. No.: WO98/32092

PCT Pub. Date: Jul. 23, 1998

(30) Foreign Application Priority Data

Jan. 17, 1997 (AU) .............................................. PO4647
Sep. 17, 1997 (AU) .............................................. PO9233

(51) Int. Cl.[7] ................................................ H04Q 5/22
(52) U.S. Cl. ................. 340/10.4; 340/825.2; 340/10.2; 340/10.41
(58) Field of Search ............................... 340/10.4, 10.3, 340/825.54, 10.2, 825.2, 10.41, 10.1

(56) References Cited

U.S. PATENT DOCUMENTS

| | | | |
|---|---|---|---|
| 4,663,625 A | | 5/1987 | Yewen |
| 5,235,326 A | * | 8/1993 | Beigel et al. .......... 340/825.54 |
| 5,537,105 A | * | 7/1996 | Brick et al. .................... 705/20 |
| 5,621,396 A | * | 4/1997 | Flaxl ..................... 340/825.54 |
| 5,689,238 A | * | 11/1997 | Cannon, Jr. et al. ........ 340/568 |
| 5,742,237 A | * | 4/1998 | Bledsoe ................. 340/825.49 |

FOREIGN PATENT DOCUMENTS

| | | | |
|---|---|---|---|
| AU | B-658857 | 7/1992 | |
| EP | 0 685 825 A2 | 12/1995 | |
| EP | 1017014 | * 6/1996 | .......... G06K/17/00 |
| EP | 0 727 752 A2 | 8/1996 | |
| EP | 0727752 | * 8/1996 | ............ G06K/7/10 |
| EP | 0 494 114 B1 | 11/1996 | |
| GB | 2 152 335 A | 7/1985 | |
| WO | WO 94/19781 | 9/1994 | |
| WO | WO 95/14938 | 6/1995 | |

* cited by examiner

Primary Examiner—Michael Horabik
Assistant Examiner—Vernal U Brown
(74) Attorney, Agent, or Firm—Larson & Taylor, PLC

(57) ABSTRACT

A system is provided for processing articles in a warehousing or merchandising operation wherein information bearing electronically coded labels are attached to the articles to be processed. The system uses the principle of electromagnetic communication in which an interrogator containing a transmitter generates an electromagnetic signal which is transmitted to electronic labels containing label receiving antennas. The electronic labels are attached to articles as they are processed. Each label antenna receives a proportion of the transmitted energy and operates a reply generation circuit connected either to the label receiving antenna or a separate label reply antenna with the result that an information bearing electromagnetic reply signal is radiated by the label.

28 Claims, 14 Drawing Sheets

| Signal | Description |
| --- | --- |
| EOR | End Of Reply |
| CRS | Continue Reply Sequence |
| REC | Reply End Confirmed |
| SER | Structured End Of Reply |
| RAR | Resume All Replies |
| RIC | Resume Initial Conditions |
| IIT | Increase Interval Time |
FIG 7
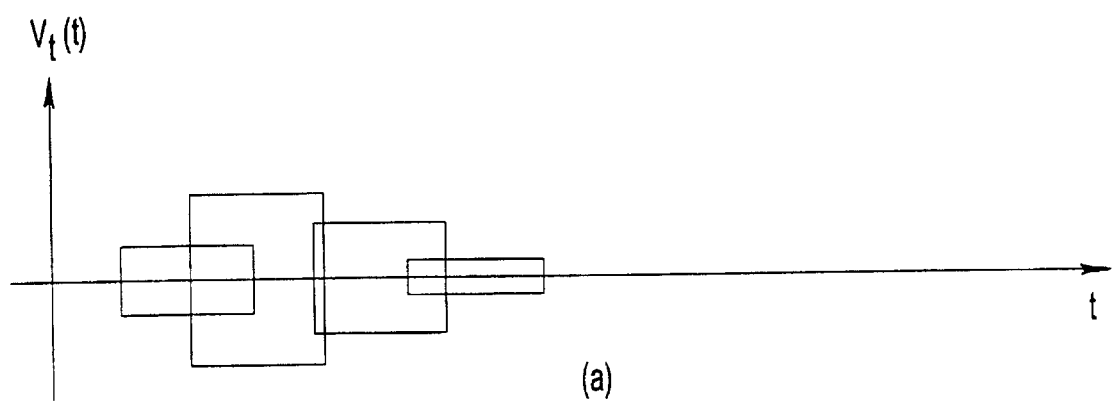
(a)
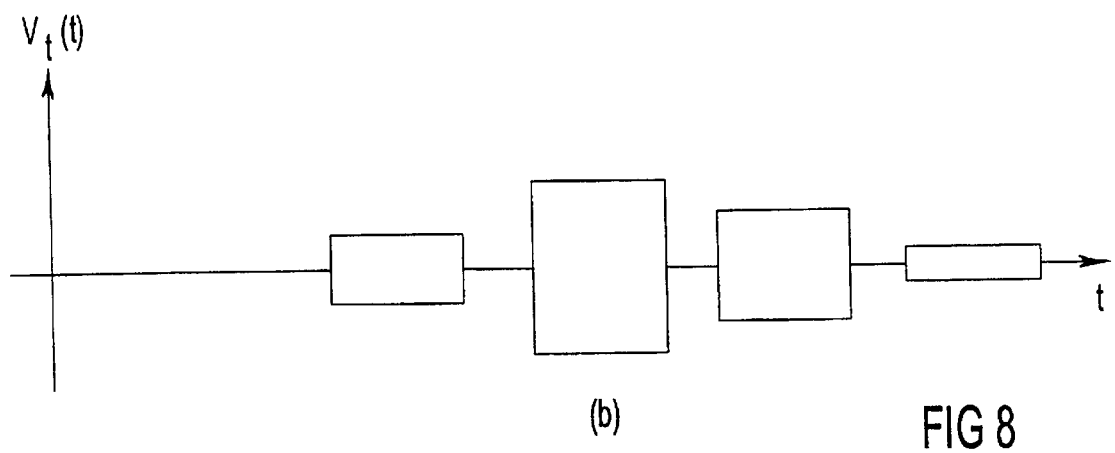
(b)
FIG 8

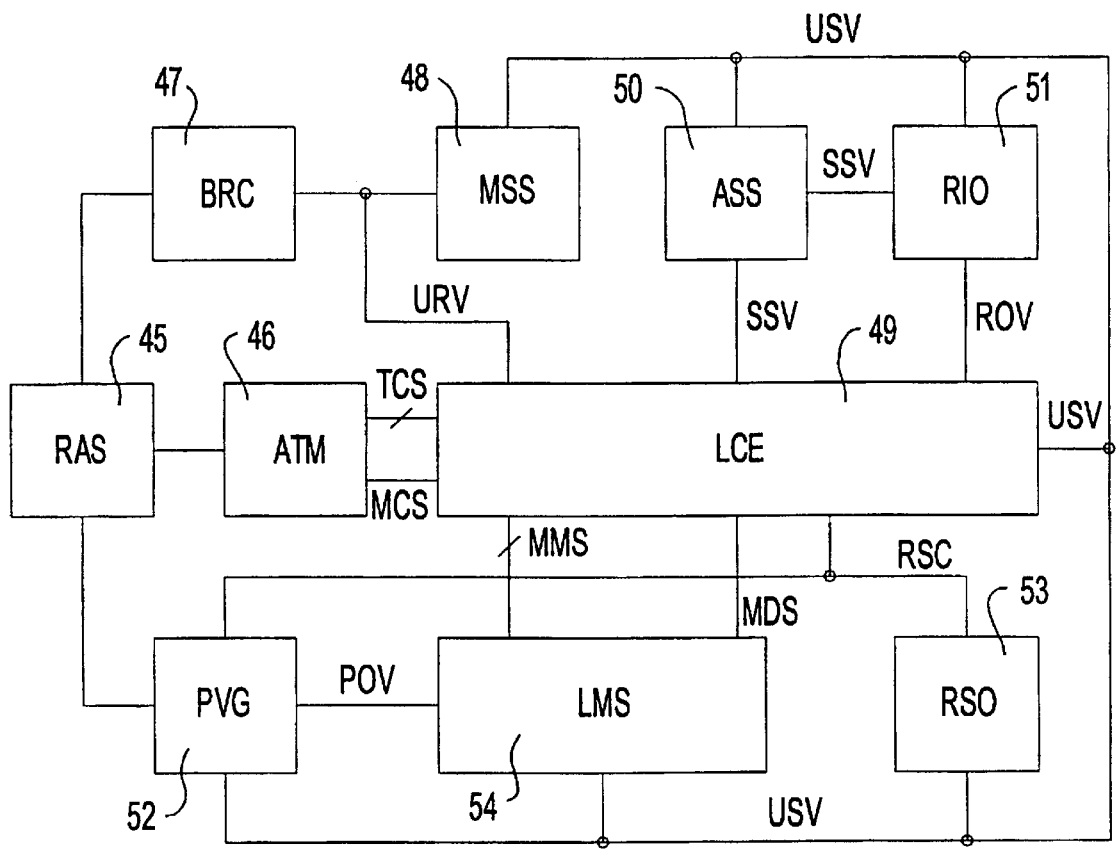

BLOCKS:

ASS  Auxiliary Supply System
ATM  Antenna Tuning and Modulation
BRC  Bridge Rectifier Circuit
LCE  Label Control Engine
LMS  Label Memory System
MSS  Main Supply System
PVG  Programming Voltage Generator
RAS  Resonant Antenna System
RIO  Reply Interval Oscillator
RSO  Reply Sub-carrier Oscillator

SIGNALS:

MDS  Memory Data Signal
MMS  Memory Management Signals
POV  Programming Output Voltage
ROV  Reply Oscillator Voltage
RSC  Supply Sub Carrier
SSV  Sustained Supply Voltage
URV  Unfiltered Rectifier Voltage
USV  Unsustained Supply Voltage

FIG 16

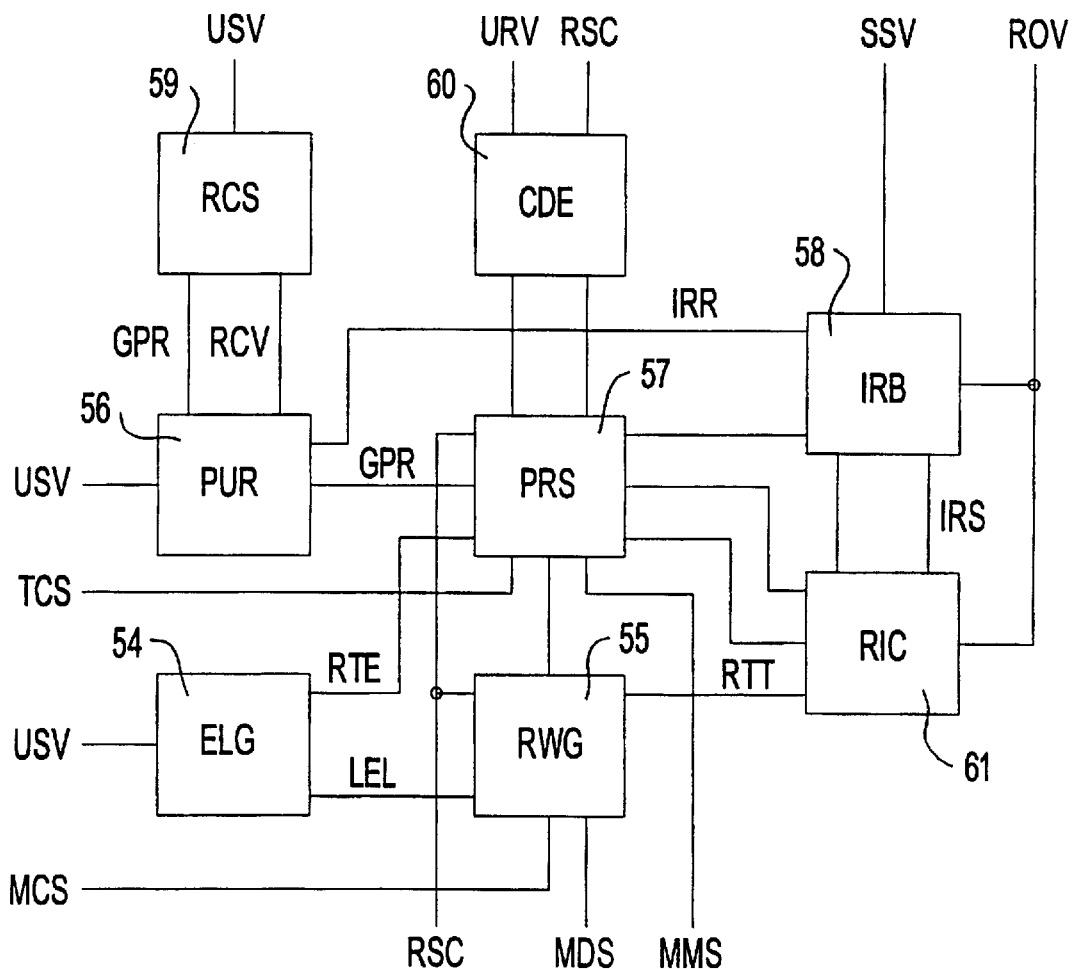

BLOCKS:

ELG  Excitation Level Generator
CDE  Command and Data Extractor
IRB  Isolated Register Block
PCS  Programming Control System
PRS  Post Reset Sequencer
PUR  Power Up Reset
RCS  Reset Control System
RIC  Reply Interval Controller
RWG  Reply Waveform Generator

SIGNALS:

IRR  Inhibit Reply Reset
IRS  Inhibit Reply Signal
MCS  Modulation Control Signal
MDS  Memory Data Signal
RTE  Reply Threshold Exceeded
RTT  Reply This Time
TCS  Tuning Control Signal
LEL  Label Excitation Level

FIG 17

MULTIPLE TAG READING SYSTEM

The field of application of this invention is in a warehousing or merchandising operation wherein information-bearing electronically coded labels are attached to objects which are to be identified, sorted, controlled or audited, by means of a process in which information passes between an interrogator, which creates an electromagnetic interrogation field, and electronically coded labels which respond by issuing a reply signal which is detected by the interrogator, decoded and supplied to other apparatus used in the sorting, controlling or auditing process. Variants of such systems are known, for example from Australian Patent 658857 of Marsh and Lenarcik or Australian Patent 664544 of Turner and Cole. In some variants of the system the interrogation medium may be other than electromagnetic, such as optic or acoustic.

In normal operation the labels may be passive (ie have no internal energy source and obtain the energy for their reply from the interrogation field), or active (ie contain an internal energy source, for example a battery), and respond only when they are within or have recently passed through the interrogation field which may have the function of signalling to an active label when to commence a reply or series of replies, or may in the case of a passive label provide energy a portion of which is used in constructing the reply.

A feature which is common to almost all systems is that it is desirable that the circuits within the labels be kept simple, so that they may be economically manufactured.

A common problem in such systems is that an unknown plurality of labels may be simultaneously present in an interrogation field, and the process of communication between interrogator and label must be structured so that all labels present in the interrogation field are detected.

One approach to this problem is presented in Australian Patent 664544 of Turner and Cole and is to design labels so that they reply intermittently and at unrelated intervals, without reference to timing signals issued by the interrogator, so that over time there is an increasing probability that a given reply will not have permanently overlapped with others, and will be correctly read and decoded by the interrogator.

A shortcoming of this system is that when labels with an inter-reply interval having only small variation are used, the system does not perform well when the number of labels simultaneously present in the interrogation field exceeds a number, roughly equal to the ratio of the average interval between replies from a single label to the time taken for a single label reply, such that there is a reasonable probability that after a label has replied a few times at least one of its replies will have occurred in a time interval not occupied by other label replies. When the number of labels simultaneously present in the interrogation field considerably exceeds this number, there is only a small chance that a given reply will not be interfered with by others, and a long time elapses before all labels have been successfully read.

A further shortcoming of this system is that it tacitly assumes that all labels present at one time in the interrogation field are differently coded, so that the interrogator has a means of distinguishing replies from all labels, and can give an indication of how many labels are in the field as well as giving their information content. In the case where it is desired to code the labels into classes, and have for labels which are to be attached to identical objects the same information content, it is no longer possible to distinguish the total number of labels in the field, or the total number of labels of each class in the field.

Another disadvantage is that labels once read, continue to interfere with labels still to be read, and the total time for reading all labels is thereby increased. It is also a disadvantage that there is no absolute guarantee that within any given time all labels will be read, there is still a statistical probability, albeit small, that some labels will have suffered interference throughout the period allocated to their interrogation.

One approach to this problem has been proposed in the Australian patent 658857 of Marsh and Lenarcik. In this solution the replies from labels are, as they are received, evaluated for their data content and the correctness of the data content, as evidenced by a series of check bits embedded into the reply, and as soon as a label reply has been correctly received, the correctness of the decoding is examined, and if it is found that the decoding was correct, and acknowledgment of correct reception is made by providing a brief interruption to the signal transmitted by the interrogator, and any label which has just replied is permanently turned off, ie it issues no further replies. It has been assumed in this disclosure that in this way each label of a number of identically coded labels can be individually detected, counted, and silenced, so that the total number of such identically coded labels present in the field can be determined.

There are several problems in this approach. One of these derives from the so-called small signal suppression effect, which is common with the phase modulated reply signals generally employed in label replies, and which has the result that if two labels reply at one time with significantly different reply signal strength, the stronger signal will be correctly decoded by the interrogator while the weaker signal will be ignored, with the result that both of the labels will cease transmission in response to the acknowledgment signal, although only one of them will have been counted. This problem will exist whether the labels are differently coded or identically coded.

Although in the case of differently coded labels the problem may in principle be dealt with by having the acknowledgment signal contain the entire label reply code, and arranging through a considerable increase in complexity of the label circuit so that it will only cease replying when it has received a specific acknowledgment which is clearly directed solely at itself, this solution is undesirable as it can only be implemented at the cost of considerable increase in complexity of the label circuit. More serious, however, is the fact that when a number of identically coded labels are simultaneously present, this remedy is completely ineffective, as there is no mechanism to prevent the occurrence of simultaneous replies from two identically coded labels with widely different reply strengths, as can easily occur as a result of significant variation of the interrogation signal strength throughout the scanned region, and independent significant variation in the orientation sensitive coupling between a label antenna and the interrogation field, with consequence that the pair of replies is seen as one.

It is an object of the present invention to at least alleviate the disadvantages and problems discussed above.

It is desirable for economy of manufacture to maintain a simple label design, and as an aspect of this to allow labels in their reply generation process to be substantially self-timed.

It is desirable to cater efficiently for a significantly varying plurality to labels in the interrogation field at various times, and to allow both for situations where labels all have different information content and for situations where groups of labels are coded with the same information content. In all of these situations it is desirable to provide a precise report of the identities all labels in field and in particular the number in each group of labels with same information content.

It is desirable to allow significant time for reply signal decoding and error checking in the decoding process.

It is also desirable to resist errors arising from the unpredictability of reply positioning and signal strength whereby a reply from one label may obscure a reply from another, and a weakly replying label may have its reply sequence mistakenly curtailed through reception of a signal intended for a strongly replying label.

Most of the above desirable features may be satisfied by allowing two way communication between the interrogator and the labels. In contrast to simpler systems in which the interrogator merely provides an energising signal for the label or a trigger signal telling the labels when to begin a sequence of replies, in this disclosure the interrogator, in addition to receiving and decoding the replies from labels, can send to the labels a limited number of information bearing signals, and the labels can act upon those signal in simple but useful ways.

The signals issued by the interrogator can be divided into classes. One class of signals may be issued at any time. Other classes of signals may be issued by the interrogator in response to the signal level received by the interrogator, or the history of signal levels received by the interrogator. A further class of signals may influence the behaviour of a label at any time in its reply cycle. A still further class of signals may influence the behaviour of a label only if it is received within a fixed portion of the reply cycle. Some of the interrogator signals may provide an indication of the length of time interval during which a reply from a label or labels has recently been received, and some signals may provide an indication of the uniformity of amplitude of the signal received by the interrogation during that period. The classes of transponder signals need not be distinct; a signal may belong to one or more classes.

According to the present invention there is provided a label reading system including:

an interrogator including a transmitter for generating an interrogation signal and a receiver for detecting and decoding a reply signal;

an interrogation field creation means including a transmitter antenna connected to said transmitter for generating from said interrogation signal an interrogation electromagnetic field through which an object possessing a code responding label may pass;

said code responding label including a label receiving antenna for receiving from said interrogation field a label interrogation signal, means for generating a label reply signal and means for generating from said label reply signal a reply electromagnetic field;

a receiver antenna connected to said receiver for receiving said reply signal from said label reply field; and wherein said interrogator includes means for detecting strength of said reply signal and for generating a signal indicative of said strength.

Preferred embodiments of the present invention will now be described with reference to the accompanying drawings wherein:

FIG. 7 shows a listing or table of various interrogation signals;

FIG. 8 shows an arrangement in time of label replies;

FIG. 16 is a block diagram of a label circuit;

FIG. 17 is a block diagram of a label control engine;

Figure 1:
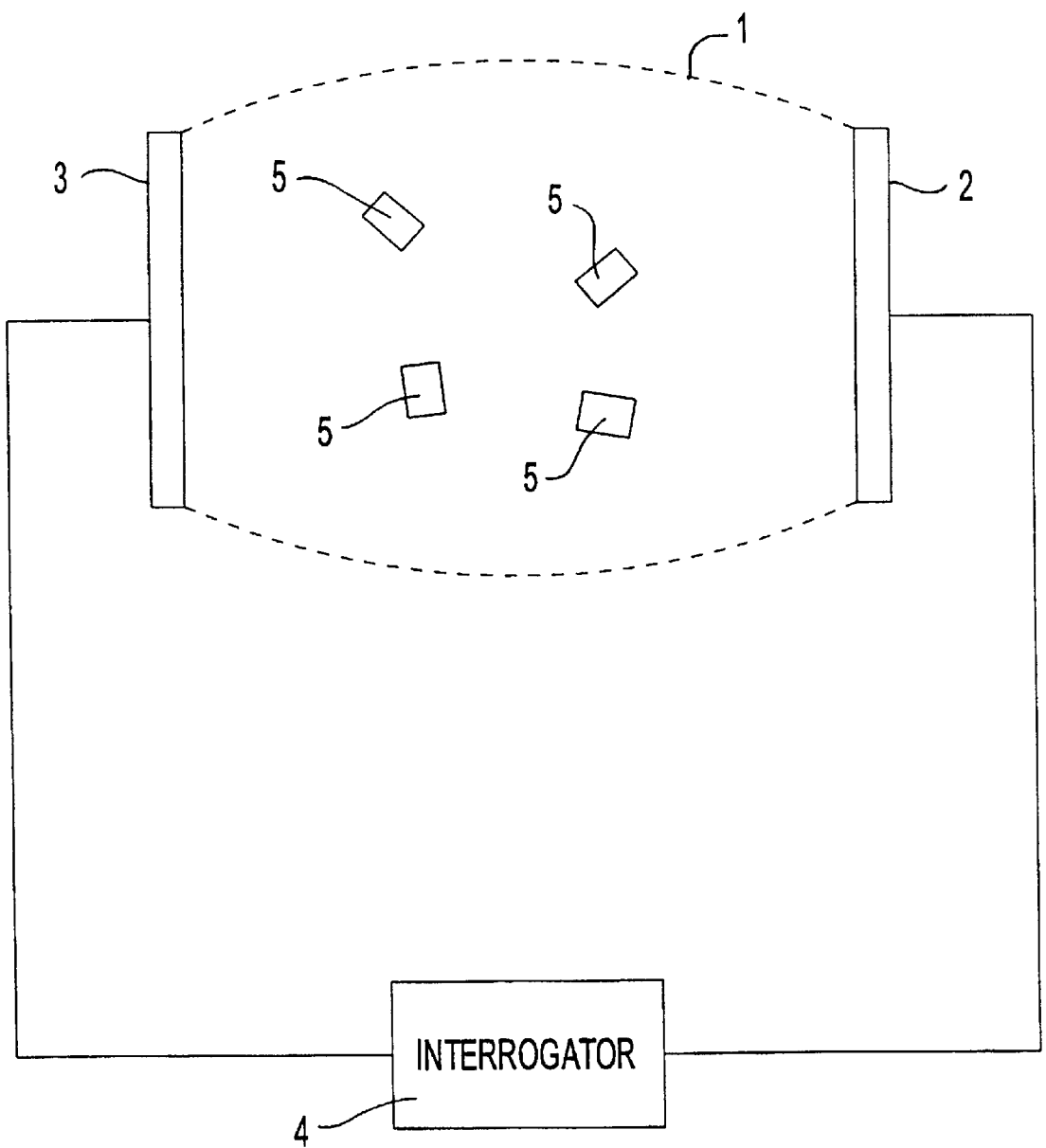
FIG. 1 shows a number of objects in a scanned region, and an interrogator and its antennas.

FIG. 1 shows in outline form a preferred embodiment of the invention, in which an interrogation region 1 contains an interrogation field which is established by a pair of interrogation antennas 2 and 3 which are excited by a signal from an interrogator 4. The interrogation region 1 contains a number of labelled objects 5, the information on which labels is to be detected. In a preferred embodiment, coupling between antennas associated with the labels and antennas associated with the interrogator takes place in the high frequency region, via almost-near-field magnetic filed coupling, and passive labels can derive their energy from that field.

The reply signals for the labels in this embodiment are issued intermittently, with periods of label inactivity between the relies from an individual label, so that the other label replies can hopefully fall in such periods and be detected without interference. Each label may contain a number of internal oscillators, one generating a reply carrier frequency used forming the label reply signal, and one controlling the times at which reply signals are offered by that label. The latter oscillators can vary in frequency for a number of simple reasons canvassed in Australian Patent number Patent 664544 of Turner and Cole, with the benefit that replies from different labels do not permanently overlap.

Figure 2:
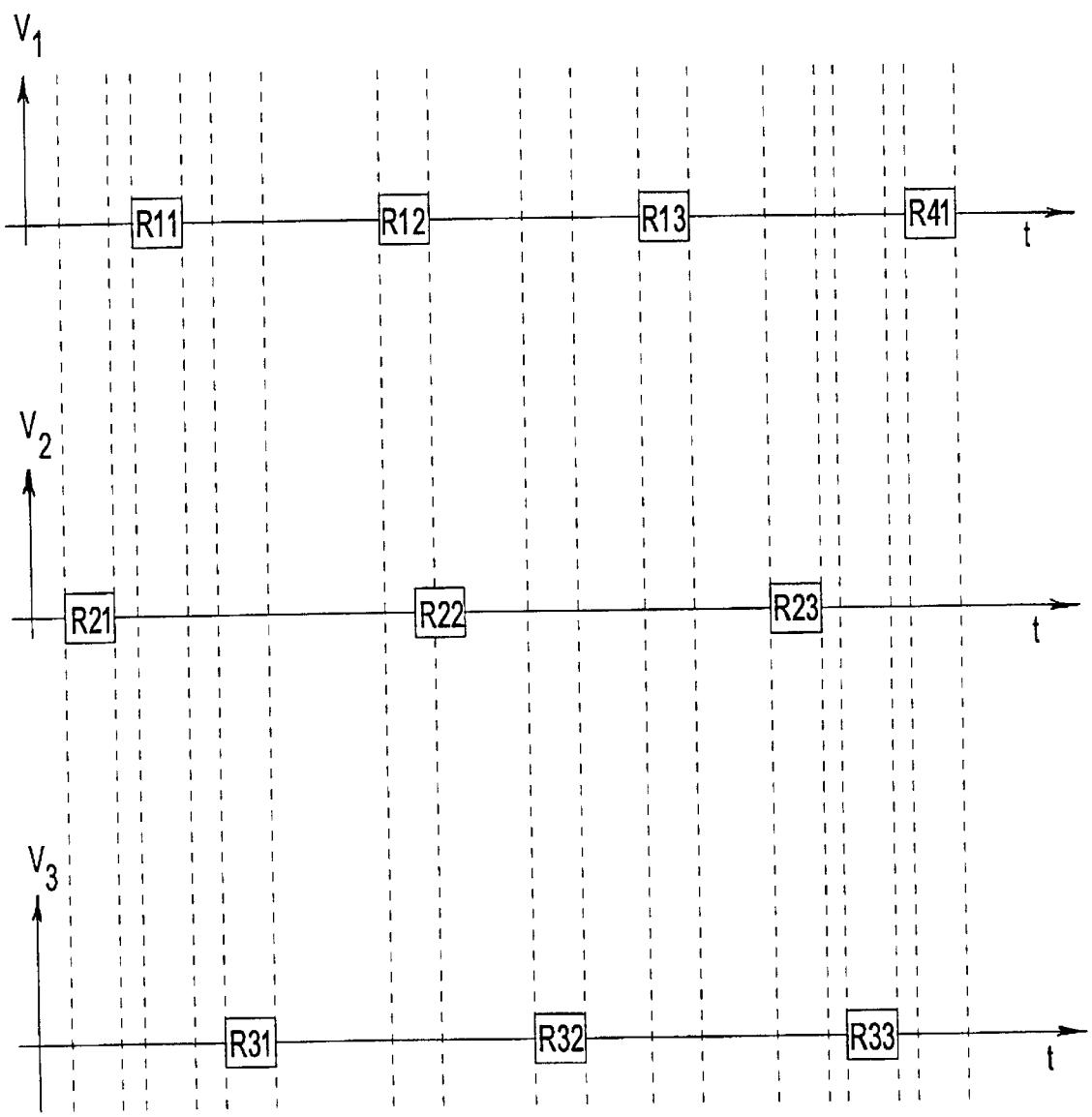
FIG. 2 shows reply positions for several simultaneously replying labels.

FIG. 2 illustrates aspects of a form of label reply from several different labels. In FIG. 2, the reply numbered as $R_{12}$ is the first reply from the second label. In general a reply numbered as Rij is the ith reply from the jth label. It will be noted that: the replies from each label are here issued at regular intervals for that label; each reply is uniform in amplitude and of the same length; the reply intervals for each label differ; the spacing of replies from one label is significantly greater that the time for a reply; and that the reply from one label sometimes overlaps another but reasonably often it does not. These facts enable each reply to be detected without interference from another reply after a sufficient but indeterminate time.

Figure 3:
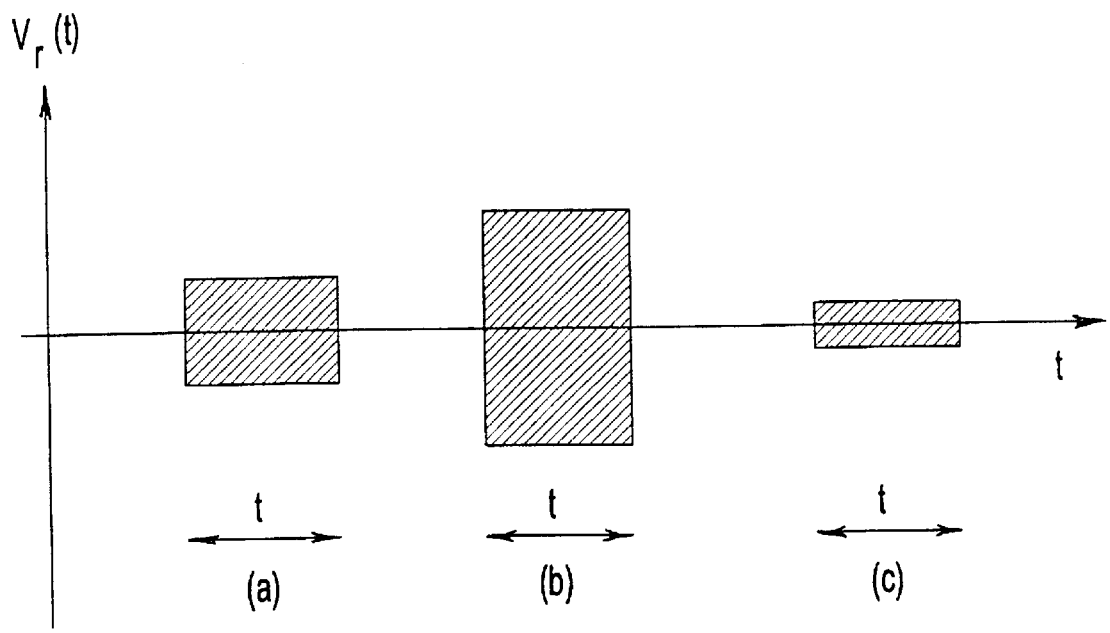
FIG. 3 shows the form and time position of a number of label replies.

FIG. 3 shows several aspects of label replies in this kind of system. In the diagram, non-overlapping replies for three labels are illustrated. In each case the vertical axis is to be interpreted as the strength of reply signal reaching the label antenna. The replies may be of different amplitudes because the labels may be situated in regions of different field strength, or because labels of different orientations may be differently coupled to the available interrogation field at the label locations.

Figure 4:
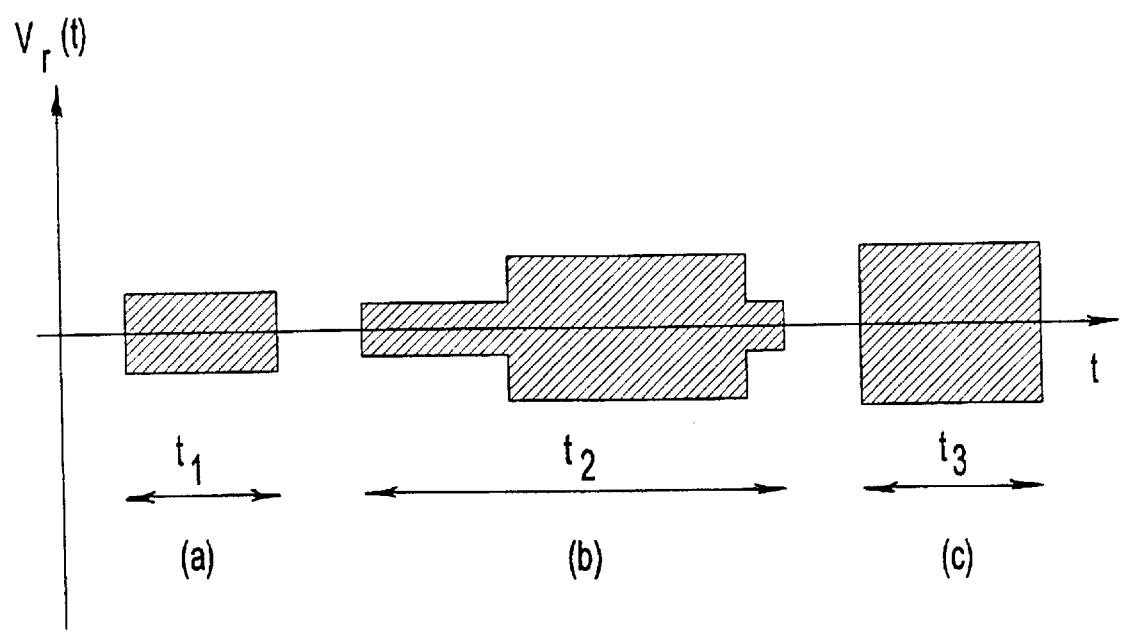
FIG. 4 shows forms of combined reply signals as seen by the interrogator.

FIG. 4 illustrates a typical reply signal as detected by the interrogator receiver antenna. Here, because of the possibility of overlapping replies of different positioning and strengths, a range of behaviours is present, in which the resultant signal may be of non-uniform amplitude and may be of duration greater than a single label reply. For the received signal indicated, it would be expected that the signals at (a) and (c) would be found to correspond to a single label reply and be correctly decoded, but the signal at (b) would not.

Figure 5:
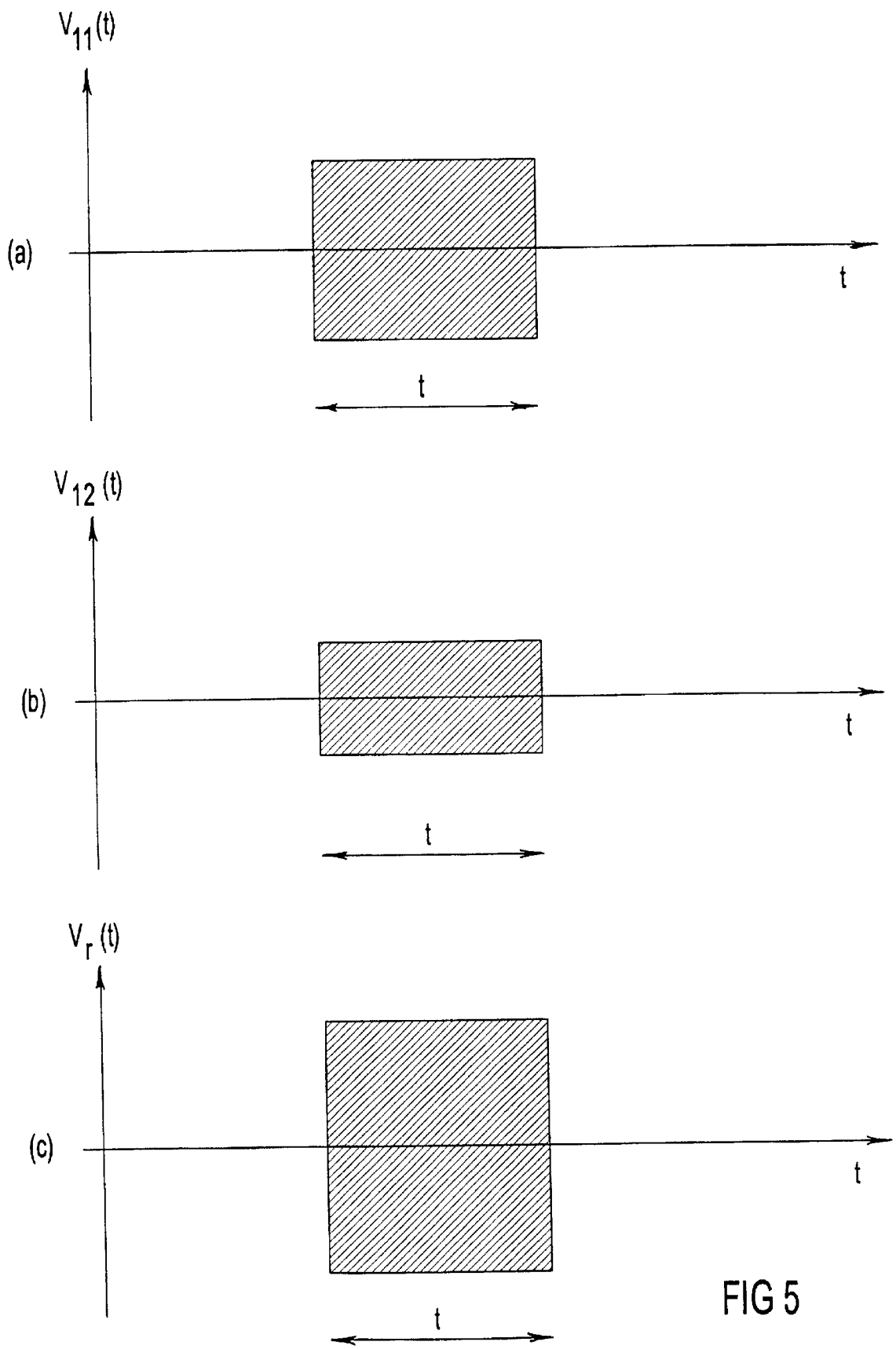
FIG. 5 shows two almost simultaneous reply signals from two labels.

FIG. 5 illustrates an important characteristic of replies which can occur as a result of various facts discussed above. In (a) and (b) of FIG. 5 are illustrated the label antenna signals for two replies which happen to coincide in time, but are of significantly different amplitudes. In (c) of FIG. 5 there is illustrated the result when the two signals are combined in the receiver antenna of the interrogator, again with significantly different amplitudes. It may be noted that the resulting signal is of the length of a single reply and is of substantially uniform amplitude. It is likely that decoding of the resulting signal would indicate that a single reply has been received, and is of the information content corresponding to the stronger reply. This effect, which is common in the generally employed phase coded reply signal systems, is known as the small signal suppression effect.

In one preferred embodiment labels may be configured to reply intermittently once having entered an interrogation field, and may be powered by the field or may have been caused to begin replying through having entered the field, either for a definite or indefinite number of replies, or until they have received a signal to cease replying.

The intervals between replies may vary in pseudo-random manner within a label, as disclosed in Australia Patent specification 664544 of Turner and Cole, may vary from label to label depending on reply code or on manufacturing tolerances, or as result of variation in interrogator power level experienced by different labels as result of differing positions or orientations within the field. Although the interval varies, the duration of label reply is substantially the same for each label.

Figure 6:
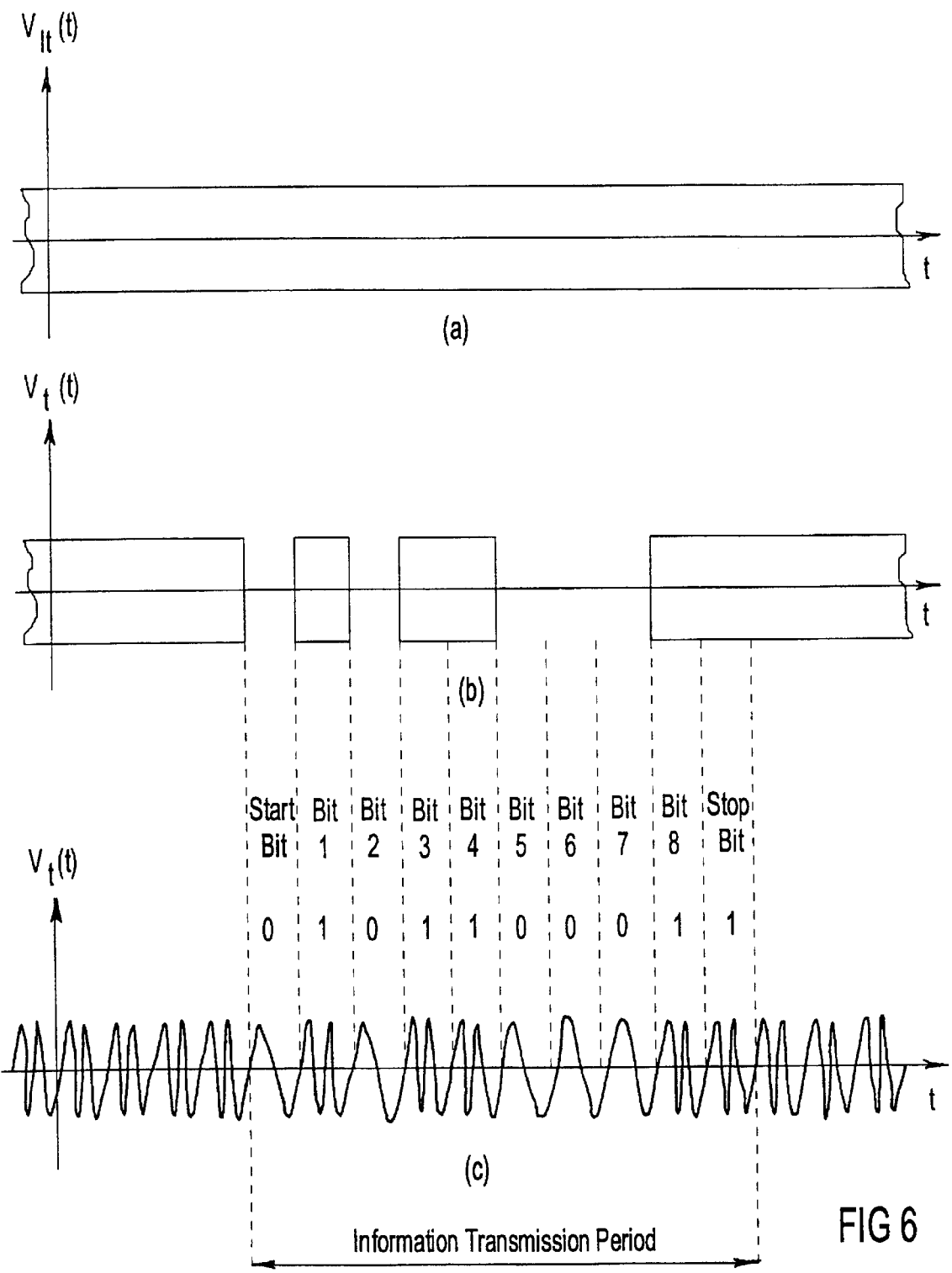
FIG. 6 shows three forms of interrogation signal.

Additionally to these features, the labels are configured to respond to command signals from an interrogator. Such command signals may take the form of variation in the amplitude or frequency of the interrogation signal. FIG. 6 shows some possible interrogation signals. In (a) of FIG. 6, an unmodulated energising signal is illustrated. In (b) of FIG. 6, periodic brief interruption of the interrogation signal, for periods short compared with energy storage times in the labels, is shown to provide a simple way for transmission of eight bits of binary data complete with start, stop and parity check bits. In (c) of FIG. 6, continuous transmission of energy is illustrated, with frequency modulation to impart data from the interrogator to the labels.

In this embodiment one command signal can cause the labels to vary intervals between reply signals. Such variation could take the form of variation in each label of a pseudo random sequence which governs its reply interval, but more commonly can take the form of a simple doubling of the label's reply interval. In addition, another signal can cause the label to cease replying. Yet another signal can cause a label to resume is reply sequence if it has ceased offering replies. A further signal can cause a label to resume replying provided it has only recently ceased replying. Still further signals can have results which are discussed later herein. FIG. 7 shows a listing of some interrogator to label signals which are required in various embodiments of the invention described herein.

FIG. 8 shows an arrangement in time of replies before (a) and after (b) interval time adjustment as a result of an interrogator increase interval time (IIT) command. In particular, this figure shows that a doubling of the reply interval time can transform four overlapping undecodable label replies into four distinct and separately decodable replies.

In a preferred embodiment the interrogator is configured to sense the level of reply signal entering its input and to develop an internal signal indicative of whether or not a reply signal is being received at that time from one or more labels.

The interrogator may additionally be configured with means to record over time the starting and stopping times of apparent replies, and the average proportion of time for which label replies are sensed compared with the amount of time for which label replies are not sensed.

In this embodiment the interrogator may additionally be configured with circuits to measure each interval of time for which label replies are sensed, and to compare that interval with the known time for a single label reply from any one label.

In addition the interrogator can examine the extent of amplitude variation in each interval of which a reply signal is being detected by the interrogator.

The interrogator can also detect, after the conclusion of an interval in which a reply signal is being collected, the content of the information so collected, including any reply code check bits, and when the information collected cannot be correctly decoded, develop an internal indication of that fact. That indication need not be developed immediately after the conclusion of the interval which reply signals were being received, but should be developed in a time which is reasonably short, but not very short, in relation to the normal length of a reply signal. This time might be called the error detection time.

The operation of this embodiment is as follows. Labels are brought into the interrogation region in which the interrogation field exists and as they enter begin replying, or alternatively a group of labels already in the interrogation region in which there was initially no interrogation field begin replying after the interrogation field is turned on.

The interrogator first examines the proportion of time for which labels appear to be replying. If the interrogator determines that on the average for only a small fraction of the time it detects intervals between replies, it is reasonable assume that for the present value of average reply spacing in the labels the number of labels simultaneously in the field is too large for there to be a reasonable probability that some label replies will be heard without overlap with others, and the interrogator in consequence sends out an Increase Reply Spacing (IRS) signal. Each the label then doubles its inter-reply spacing interval. The interrogator then examines the variation with time of its input signal, and if necessary sends out another IRS signal. It continues in this mode until it is satisfied that replies are occurring with at least some intervals between them which are long enough for there to be a reasonable probability that at least some label replies are being received without interference from other label replies.

When the interrogator has by this means brought about this desirable condition, it begins sending, at the conclusion of each period in which it appears, from the signal strength entering the interrogator, that a reply or overlapping replies was being received, a series of End of Reply (EOR) signals. Such signals can take the form of a single momentary extinguishing of the interrogation signal, or might take the form of one particular signal word among a series of commands (described in detail herein) which the interrogator can supply to the labels.

It may be noted that when the End of Reply signal is sent, it is not known whether a single reply or multiple interfering replies has been received, and it is not known whether what has been received can be correctly decoded.

The responses of different labels to the End of Reply signal are designed to be different. The majority of labels will just ignore the signal, although in some cases, where passive labels are used, any labels which are in the process of replying will abandon their reply and wait for the next instant in their reply cycle at which a reply should commence, and will then commence a fresh reply at that time.

Any label which has just completed its reply, however, will set an internal Reply End Received (RER) bit within itself. It will in this condition maintain the normal operation of those circuits which determine the reply intervals, and will remain in a condition in which it can detect further signals from the interrogator, and will also maintain in operation a circuit which can detect the time at which such signals may arrive, relative to the time at which the End of Reply (EOR) signal was received.

Provided in those labels no further signals are received from the interrogator within a set time period, for example one eighth of the period for the issuing of a label reply signal, the end of Reply End Received (RER) bit of that label will remain set, and when the time in the labels reply timing cycle for the label to issued it next reply comes, the label will be inhibited (as a consequence of the RER bit still being set) from issuing its reply.

After the interrogator has issued an End of Reply (EOR) signal, it proceeds to examine the length and amplitude uniformity of the signal during the most recent continuous period in which reply signals were being received. If the length of that period is a close match to the length of a label reply, and the variation of reply signal amplitude is small and therefore not suggestive of the fact that that more than one label was replying in the period being examined, the interrogator proceeds to the reply decoding and error checking operation described below. If the reply period length and reply uniformity do not survive these tests, the interrogator sends a Continue Reply Sequence (CRS) signal to all labels. The labels are designed so that only labels which have just recently had their Reply End Received (RER) bit set will respond to this signal, and will do so by resetting the reply end received (RER) bit, and will thus continue to offer a reply at future appropriate points of their reply cycle. Any labels which have had the RER bit set more than a quarter of a reply period previously will ignore the CRS signal and will remain inhibited from issuing further replies.

After the interrogator has completed its examination of the period and uniformity of the signal most recently received, and has concluded that an attempt to decode is appropriate, it proceeds to decode and error check a digital record of the signal which it has made during the period it was receiving the reply signal. In making this record it may make use of techniques broadly as described in Australian Patent Specification 645487 of Turner and Cole.

The decoding and error checking operation may be directed to the content of the data and the check bits section of the reply, and may produce a judgement of whether or not a reply has been correctly received.

If the interrogator decides that a reply has been correctly received it transmits no signal (but of course can maintain its unmodulated energising field), but passes the data content of the received reply to a section of memory reserved for the storage of correctly received replies.

If however the interrogator determines that the reply has not been correctly received, it transmits the previously mentioned Continue Reply sequence (CRS) signal, and does not attempt to store the incorrectly decoded reply, although for internal performance monitoring it could make a separate record of what has happened. Again the labels are designed so that only labels which have just had their Reply End Received (RER) bit set will respond to this CRS signal, and will do so by resetting the Reply End Received (RER) bit, and will continue to reply at future appropriate parts of their normal reply cycle. The labels are designed so that any labels which have had their RER bit set more than a quarter of a reply period previously will ignore the CRS signal and will remain inhibited from issuing further replies.

Again it may be noted that the interrogator End of Reply signal is issued not in response to the event that a reply has been correctly decoded, but in response to the event that an interval between replies, albeit of unpredictable length or utility, has apparently commenced.

The advantages of this arrangement of controlling replies are several. One is that replies may be evaluated for length, uniformity, data content, and correctness in non-real time, after an accurate recording of them has been made, and advanced signal processing techniques applied to that evaluation. Another is that the inhibition of replies creates at the earliest time a period of silence in which other labels can reply without interference, and increases the probability of correct reception of individual replies, and so speeds up the reply gathering process.

There are, however, some shortcomings in the process, deriving from the small signal suppression effect previously mentioned. It is possible that when two labels reply substantially simultaneously with significantly different signal strengths, both labels will have their RER bits set. The stronger reply may be correctly decoded and its reply passed to storage, while the weaker reply may not be noticed. Both labels will be inhibited from replying, and then the reply from the weaker label will not be counted in the recording process.

A cure for this problem may be found in another embodiment of the invention, which is successful in applications where all labels carry unique reply codes. In that embodiment, whenever a reply signal has passed the length, uniformity and data integrity checks, the interrogator can issue in addition to the previously issued end of reply (EOR) signal, a specifically coded Reply End Confirmed (REC) signal, which signal contains in addition to other data the entire reply code of the label. In this embodiment the labels are capable of receiving, recording this signal, comparing it with their internal reply code, and only confirm the setting of the RER signal if there is a match. If a label has set its RER signal but subsequently receives a coded REC signal which does not match its internal code, it will reset its internal RER bit and will continue to offer replies at the usual points of its normal reply cycle.

Although this is a feasible approach to the problem created by the small signal suppression effect, it has the disadvantage firstly that for long reply codes it involves considerable increase in label complexity, and secondly it cannot be successfully applied to the case when several labels have identical reply codes. The problems created by this situation can be dealt with by a further embodiment of this invention described below.

Figure 11:
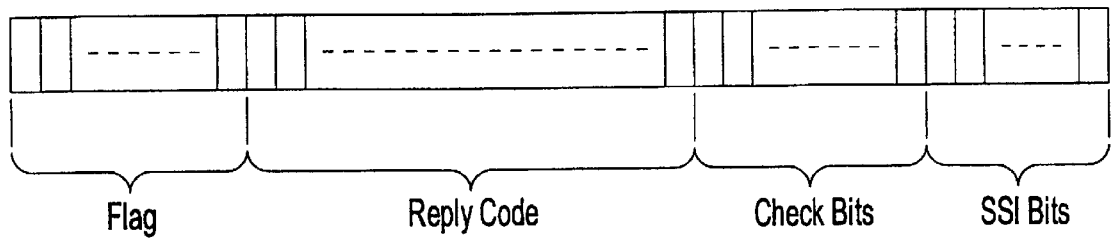
FIG. 11 shows a possible arrangement of information in a reply.

In this embodiment each label is provided with means to sense the strength of the signal with which it is being excited by the interrogator, and to convert the results of that sensing to a digital form, possibly of four bits in length, and possibly including in the process a logarithmic relation between the excitation signal strength and its digital expression. This expression of the strength of label excitation is, as shown in FIG. 11, made part of the label's reply code and is received by the interrogator. If the label moves in the interrogation field between the times at which it offers its replies, the reply strength bits for each reply will be different, but each reply will contain reply strength bits appropriate to the label excitation level from which that reply was generated.

To understand the working of this embodiment of this invention it is necessary to appreciate the fact that the strength of reply signal seen in the interrogator antenna for a relatively weakly excited label will be weak as compared with the strength of reply signal seen in the interrogator from a relatively strongly excited label. The reciprocity principle ensures that this will be particularly so when, as is usually the case, in the label the same antenna is used for receiving energy and issuing the reply, and in the interrogator the same antenna is used for creating the interrogation energising field and receiving the reply.

The result is that the replies from labels which are manufactured or coded to have the same information content will have been made different through their also reporting on an aspect of their environment. Moreover the aspect of environment reported on is just that necessary to avoid missing the weaker of two labels when their replies happen by chance to coincide with sufficient precision, and the relative amplitudes are too extreme for the detection of reply length or amplitude uniformity checks to be effective in detecting that more than one label has replied in a given interval.

The operations in this embodiment are as follows. When an interrogator has detected an end of a reply signal period it can, without attempting to determine whether the reply signal is of the right length or uniformity or can be correctly decoded, send out a more richly structured End of Reply signal than was previously described. We may call this signal the structured end of reply (SER) signal. In the new SER signal there is incorporated the last four bits of the reply signal received by the interrogator, these bits being known as the Label Excitation Level (LEL) bits. In this embodiment labels are designed to be able to detect and decode the SER signal to obtain the LEL bits. Only a label which was just completed replying and for which the LEL bits received in the SER signal match those which the label has just used in forming its reply will set its reply end received (RER) bit; all other labels will ignore the SER signal. In this way a weakly replying label will continue to reply even if its reply is masked by the simultaneous reception of an identically coded strongly replying label, and it is possible to determine with certainty both the identities of all labels in the interrogation field and also the exact number of labels in each group of identically coded labels in the field.

Although the success of the above operations depends upon two simultaneously replying identically coded labels having different label excitation level (LEL) bits, we need not be concerned with the case when these bits are the same, as slight differences between the frequencies of the normally employed on-board oscillators within the labels will make it certain that the simultaneously occurring equal strength replies will show considerable interference, and the apparent single reply will fail the amplitude uniformity or the reply error checking tests, with the result that the continue reply sequence (CRS) signal subsequently issued by the interrogator will ensure that both labels continue replying.

So that labels in this condition will be eventually separately read and silenced, some stirring of the interrogation field, such as can be obtained through the use of multiple interrogator antennas or movement of objects within the interrogation field, can be employed.

Figure 9:
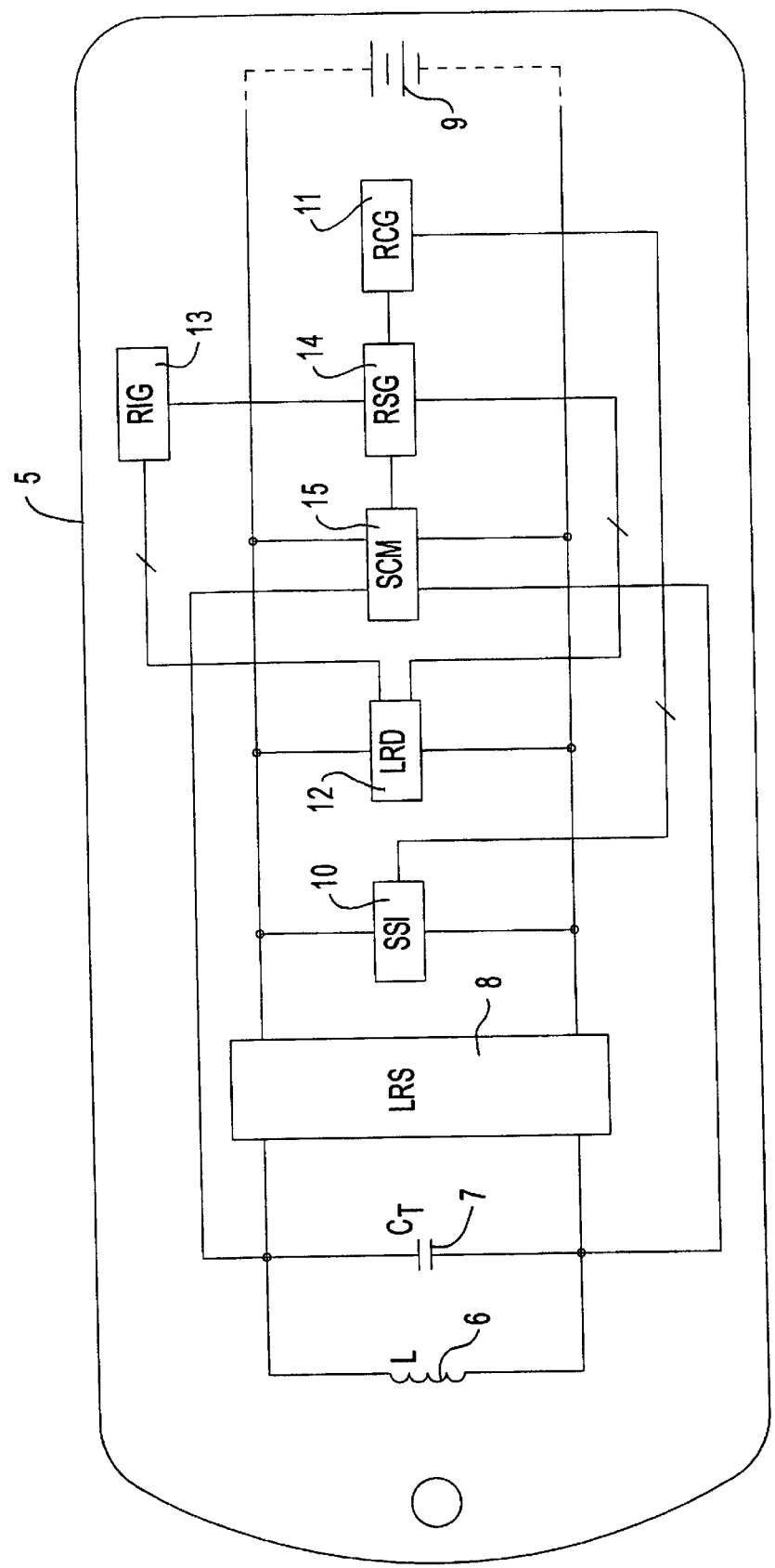
FIG. 9 shows a block diagram of a label

FIG. 9 shows some functions performed within the label 5. In this diagram, a coil 6 with inductance L is resonated with a tuning capacitor 7 of capacitance $C_T$ which has the effect of magnifying the incident signal by a magnitude equal to the loaded quality factor of the resonant circuit. In a passive labelling application, the label rectifier system (LRS) 8 uses a portion of the interrogation signal to generate dc energy of sufficient level to enable the integrated circuit of label 5 to operate reliably which might otherwise be provided by a battery 9. The signal strength indicator (SSI) circuit 10 provides a measure of the strength with which the label is being excited by the interrogator. An output is connected from this module to the reply code generator (RCG) 11 that allows the measured signal strength to be appended to the label's identification code thus allowing labels to have a unique identification code depending on their environment. The reply code generator (RCG) 11 also contains the necessary check bits to allow for error detection during an interrogation decode cycle.

The label receiver/decoder (LRD) 12 determines the class of the interrogation signal and makes a decision based on the result. Common decisions may include, but are not limited to, disable reply interval generator (RIG) 13 if a continue reply sequence (CRS) signal is not received within a quarter of a reply period after an end of reply (EOR) signal, increase interval time (IIT) signal after which the reply interval generator (RIG) 13 may halve its frequency, or if the structured end of reply (SER) signal sequence matches the sequence present in the reply signal generator (RSG) 14 from the last label reply then the reply interval generator (RIG) 13 may be disabled preventing further responses from the label.

The sub carrier modulator (SCM) 15 is responsible for superimposing the information stored in the reply signal generator (RSG) 14 onto the interrogation signal at a rate determined by the reply interval generator (RIG) 13. The sub carrier modulation may take the form of amplitude or phase shift keying.

Figure 10:
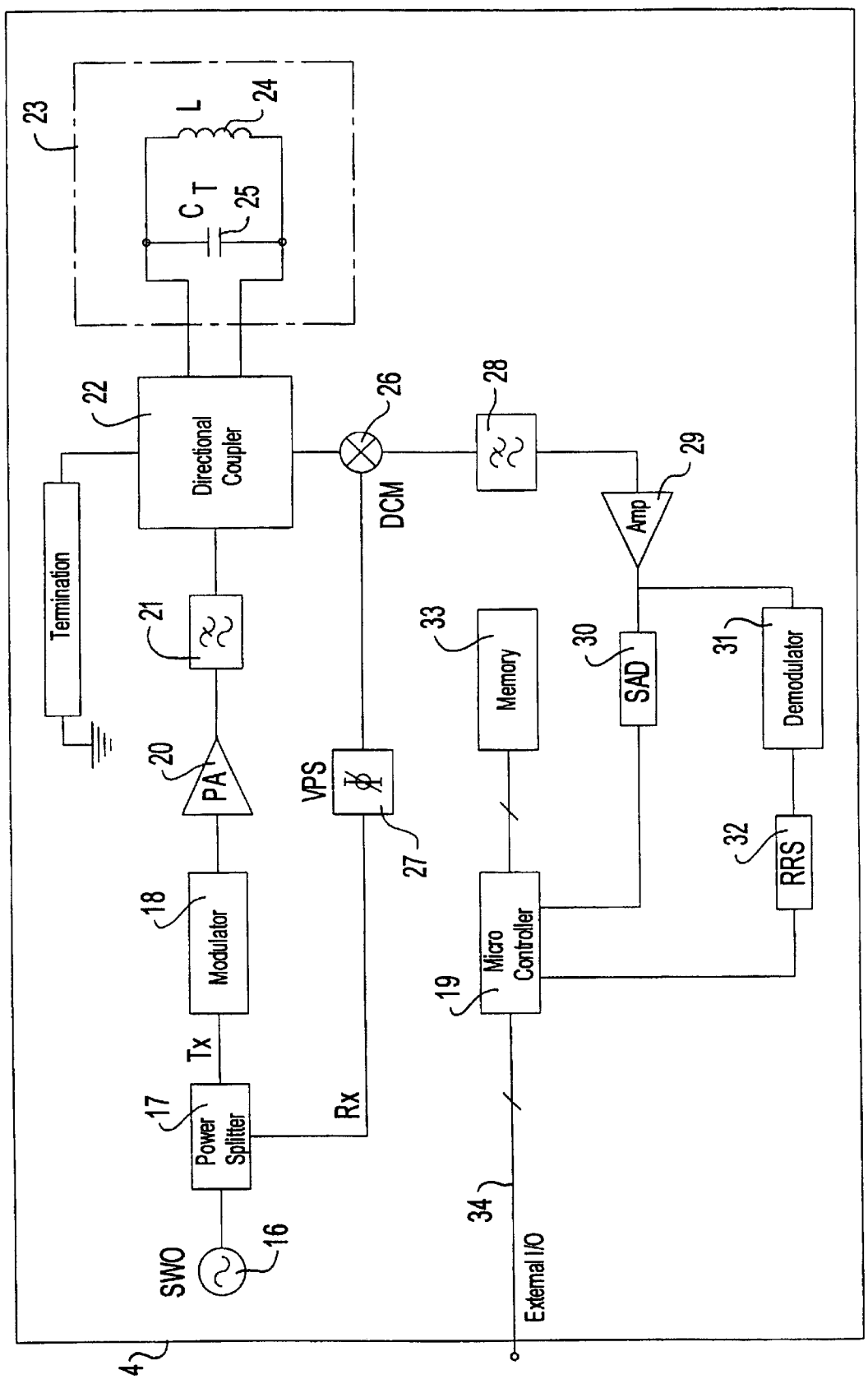
FIG. 10 shows a block diagram of an interrogator.

FIG. 10 is a functional block diagram showing a possible configuration for the interrogator 4. In this diagram, a sine wave oscillator (SWO) 16 develops a constant amplitude low noise signal at the desired interrogation frequency. This signal is fed to a power splitter 17 which distributes this signal (not necessarily evenly) between respective transmitter (Tx) and receiver (Rx) circuits.

Firstly, giving attention to the transmitter circuit, the signal is fed to a modulator 18 which allows for the generation of classes of the interrogation control signal under the control of a micro controller 19. This signal, which now may or may not be modulated, is amplified to a predetermined level by a power amplifier (PA) 20. This signal is then filtered in filter 21 to remove unwanted harmonics and passed through the output and input ports respectively of a four port directional coupler 22 and into a resonant antenna 23 possibly consisting of a loop 24

(approximately equal in diameter to the desired interrogation distance) of inductance L. This inductance is resonated by a capacitor 25 of capacitance $C_T$ at the desired interrogation signal frequency.

Turning to the receiver circuit, a modulated interrogation signal generated by a label 5 is received by the resonant antenna 23 and passed to the input port of the directional coupler 22 where a portion of the modulated signal is injected into a down converting mixer (DCM) 26 which is driven from the receiver signal derived from the power splitter 17 via a variable phase shifter (VPS) 27. The variable phase shifter 27 is present to compensate for nulls inherent in homodyne receiver systems when the receiver local oscillator and received signals are in phase quadrature. The down converted signal is then passed through a baseband filter 28 and an amplifier 29 where it is raised to a useful level.

The signal can then take two paths. The first is through the signal amplitude detect (SAD) module 30 which provides an output to the micro controller 19 that is proportional to the amplitude of the received signal. The second path is though a demodulator 31 where the relevant information is extracted from the baseband signal after which it proceeds through the reply recording system (RRS) 32 where the signal may be assessed for validity in terms of amplitude and length.

Connected to the micro controller 19 is some memory 33 that allows for the digital recording of the label's reply to be stored for post processing and also for the storage and subsequent counting of different label replies. The micro controller 19 also has a bidirectional external interface 34 to enable communication to and from the interrogator to take place.

In a still further embodiment of the invention, it may be desired to provide greater security that all labels have been correctly read, once and once only, by providing for a repeat of the entire interrogation process. In this embodiment two further interrogation signals are defined. The first of these is the Resume all Replies (RAR) signal, which has the effect of turning on replies from all labels as if none of them had been read, but preserving the possibly increased sets of reply spacings which the interrogator may have arranged for as a result of its initial examination of the entire of reply free time it is able to observe. The second is the Resume Initial Condition (RIC) signal, which has the effect of turning on replies from all labels as if none of them had been read, but reverting in each label to the initial reply interval which its hardware design or initial coding prior to being placed in service has provided. A possible arrangement of these signals, together with others discussed elsewhere in this disclosure has already been provided in FIG. 7.

One of the significant problems is reading a pluality of electronic labels simultaneously present in an interrogation field is the fact that labels of different orientations can generally exhibit significantly different degrees of coupling to an interrogation antenna. The coupling may be in some cases too small for the label to generate a readable reply.

Figure 12:
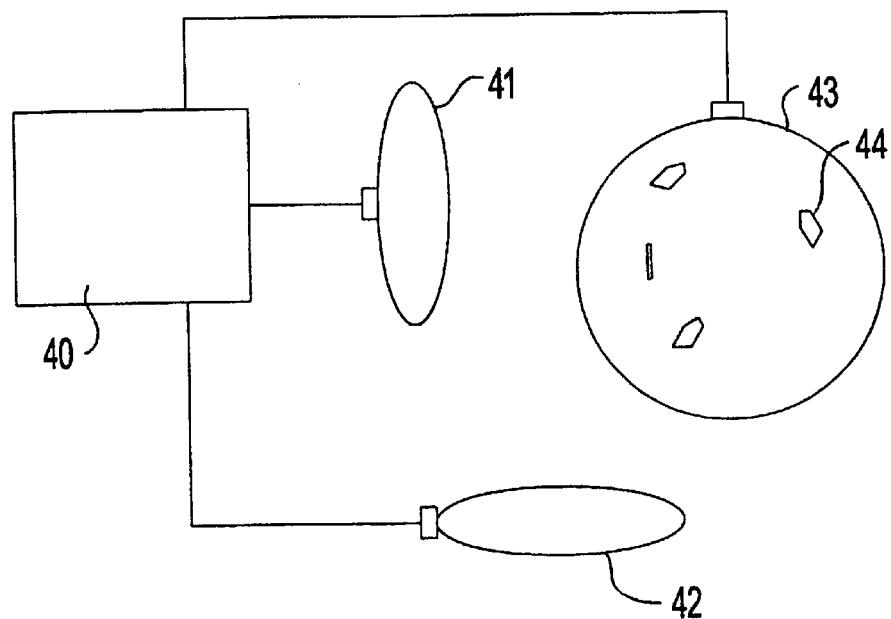
FIG. 12 shows an interrogator connected to a plurality of interrogation antennas which communicate with a plurality of labels.

In such a situation, a plurality of differently oriented reply interrogation antennas such as shown in FIG. 12 may be used. In one mode of operation the interrogator may energise each of the antennas in turn, each period of excitation being for a period long enough for the replies from as many labels as are sufficiently strongly coupled to that antenna to be detected and the labels eventually to fall silent. In this mode of operation, however, it is generally true that not all antennas will sufficiently energise all of the labels for each to reply.

There will be thus no clear indication of how many identically coded labels are present in the interrogation region.

It is common practice for the interrogator to use the same antenna system for both excitation of the labels and for receipt of their reply.

In that situation it is better to energise each of the interrogation antennas in some sequence for a period just sufficient for a single reply, and to modify the label circuit so that critical functions of a label which has been energised by one of the antennas will continue to operate while the other interrogation antennas are being energised, even if those antennas are not sufficiently strongly coupled to the label for all of its circuits to operate correctly, the critical functions being sustained for a time sufficient for the originally energised antenna to be re-energised.

Figure 13:
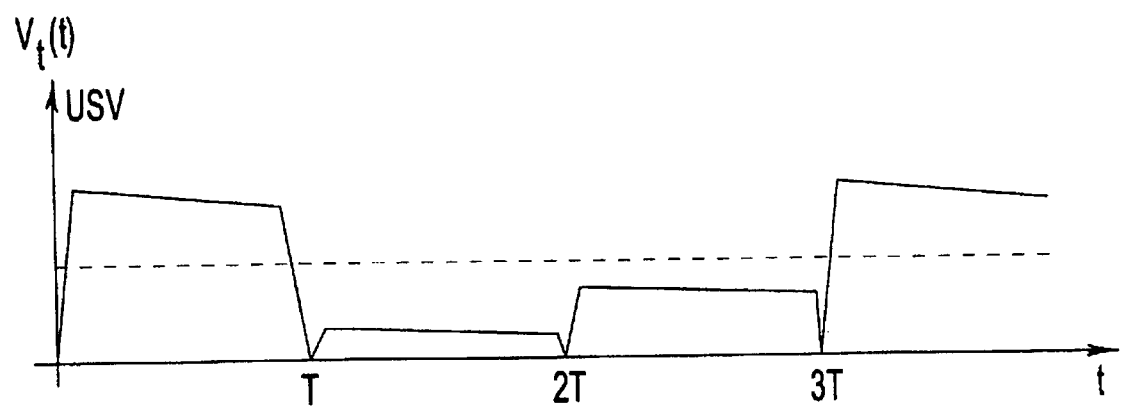
FIG. 13 shows the waveform of an interrogation signal envelope.

The operation of such a system is illustrated in FIG. 12. In this diagram an interrogator 40 is coupled to interrogation antennas 41, 42 and 43 which energise to various degrees of success the group of labels 44 within the interrogation region. Each of the interrogation antennas may be exercised in turn for a time T sufficient for receipt of a single reply from a label. Because the labels may have differing couplings to the separate antennas, the label excitation level which is seen by a single label may vary in time in a way which is illustrated in FIG. 13. Some of these levels may be sufficient for the label to reply, while some of them may be below the threshold shown in a broken line in FIG. 13, at which the label begins replying.

In one embodiment interrogator power may be varied slightly over the interrogation period of duration T to produce the variation of tag excitation level shown in FIG. 13. This variation may ensure that the circuits within a label will recognise at the beginning of an interrogation period whether or not there is adequate power for forming a reply, and delayed recognition of this fact will not curtail the time available for such reply. The design of a small amount of hysteresis into the label reply threshold circuit may ensure that a reply, once initiated, will continue until it has been completed.

Figure 14:
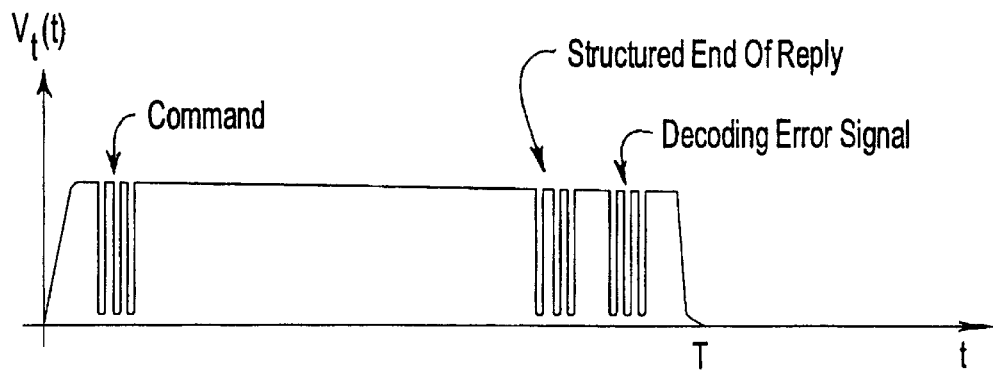
FIG. 14 shows the variation of label excitation level as a function of time when a plurality of interrogation antennas are used.
Figure 15:
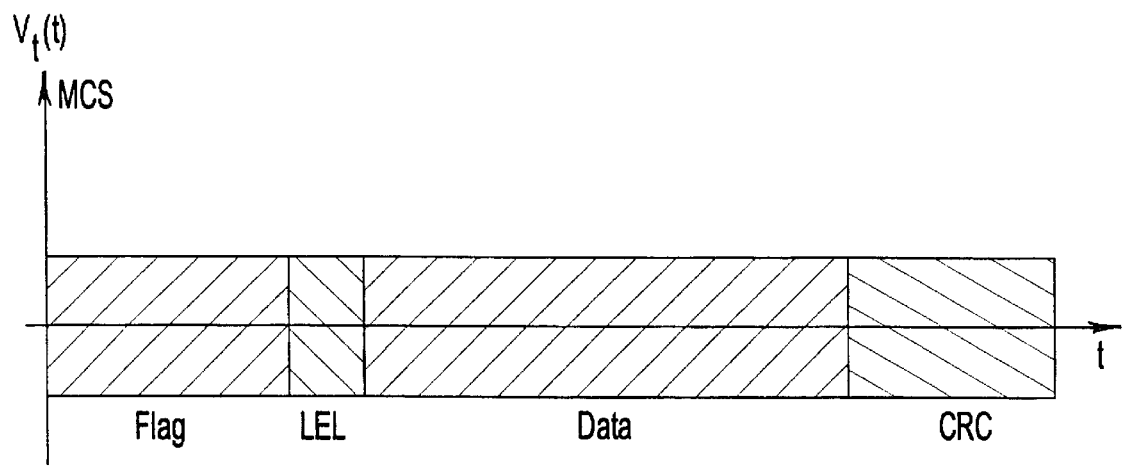
FIG. 15 shows the structure of a label reply waveform containing a flag label excitation level, data and cyclic redundancy check components.

The nature of the interrogation signal which is present over the period of time T is shown in FIG. 14. At the beginning of this period the interrogation level rises for a time sufficient for the majority of the label circuits to become initialised. Following this time the interrogation signal may contain a series of interruptions or other forms of modulation which convey to the labels an interrogator command. Following the command signal, a period of uniform illumination of the label ensues, so that the label, if it has not fallen silent in ways which have already been described, will reply during that period of illumination. At the end of a time sufficient for the label reply to have occurred, the previously discussed structured end of reply (SER) signal may be given by the interrogator if the conditions for issuing such a signal are satisfied. At a later time, after the interrogation has examined the quality of the reply received, a decoding error signal may be issued by the interrogator if the reply was not successfully decoded. One possible structure of a reply in this kind of system is illustrated in FIG. 15. The first part of the reply consists of a flag which establishes a phase reference against which the remainder of the reply may be decoded. The flag is followed by a series of label excitation level (LEL) bits. These in turn being followed by the data of the label reply, and cyclic redundancy check(CRC) bits.

In a preferred embodiment of the invention a reply sub-carrier oscillator at approximately 400 kHz may be employed, that signal being divided in frequency by four to produce a data rate of approximately 100 kHz, with four cycles of the sub-carrier oscillator being employed for signalling each bit of the reply. The reply may consist of a flag of 15 binary one bits followed by zero bit, these being followed by six label excitation level bits, these in turn being followed by 128 data bits and a 32 bit cyclic redundancy check. The total of 192 bits will take approximately 1.92 milliseconds to transmit. Allowing for the initial period of excitation of the label, the period allocated to interrogator commands, the period allocated to the structured end of reply (SER) signal and a possible decoding error signal, it may be seen that the duration T of the interrogation interval may be as much as 2.5 milliseconds. In this embodiment it is therefore necessary to sustain the operation of the reply interval oscillator (RIO) and data within the isolated register block (IRB) for at least 5 milliseconds. The use of sub-threshold microcircuit design techniques, and other appropriate-circuit design techniques discussed further below, makes this possible.

In one preferred embodiment the label reply can be given in the form of a bi-phase coded signal of a sub carrier generated on the label by a sub carrier oscillator whose frequency may be around 400 kHz. The sub-carrier oscillator generates the reply sub-carrier frequency independently of the frequency with which the label is energised, which may in one preferred embodiment be at 13.56 MHz. In consequence of the independent generation of the reply sub-carrier, the reply sub carriers from different labels will be incoherent in frequency between those labels.

One of the benefits of having a flag which may consist of, for example, 15 binary one bits followed by a binary zero, is that circuits within the receiver may at the beginning of a reply period establish a phase reference against which further bits of the reply may be decoded.

In the operation of the preferred embodiment being discussed, not all labels reply at the commencement of each interrogation cycle for each antenna. Firstly a particular antenna may not sufficiently energise a label for it to issue a reply. Secondly the replies from different labels are issued intermittently with the period between such replies being determined by a reply rate oscillator which is within the label and the frequency of which is not influenced by the coming and going of the label excitation signal as the different interrogation antenna are energised. Thirdly, a label may have fallen silent as a result of operations generally as already described.

Although in the long term the interval between replies, which is many times greater than the time duration of a reply, is determined by the reply rate oscillator, each reply, if and when it occurs, is synchronised to shortly follow the beginning of a period of interrogation excitation. This provision ensures firstly that there is time for that reply to be completed, and secondly that the positions of the flag, the LEL information, the data information, and the CRC information, are all approximately predictable, and in particular the flag may be easily detected and used to provide the aforementioned phase reference.

The label circuits are designed so that the frequency of the reply rate oscillator of each label is not affected by the coming or going of interrogator power from the different interrogator antennas which is shown in FIG. 13. In consequence, the frequencies of the reply rate oscillators within different labels will not be synchronised with one another, and even if replies from two or more labels are co-incident at one time, they will not remain co-incident for all time.

A block diagram of a label circuit which accomplishes these results is shown in FIG. 16. At the left of the diagram is shown a reply antenna system (RAS) 45 which may consist simply of an inductor. That inductor is tuned by an antenna tuning and modulation (ATM) block 46 which can consist of one of more capacitors some of which may be switched in and out of circuit by tuning control signals (TCS) and modulation control signal (MCS). The functions performed within the antenna tuning and modulation (ATM) block 46 will be discussed in more detail later herein.

The voltage developed across the reply antenna system 45 is delivered to a bridge rectifier circuit (BRC) 47 which develops an unfiltered rectifier voltage (URV) supplied to other circuits. The principal two blocks which receive this signal are the main supply system (MSS) 48 and label control engine (LCE) 49.

Details of these circuits will be described for convenience in terms of the CMOS fabrication process employing an n-well technology but obvious modifications may be made for other technologies.

The main supply system 48 can consist of a n-type series pass transistor which may be of low threshold voltage in a p-type substrate, and a reservoir capacitor. The output voltage of that main supply system is labelled as the unsustained supply voltage (USV) because, while it can survive the brief interruptions used for signalling within the interrogation energising period, it will as shown in FIG. 13 fall to zero in the period between energising different antennas. That voltage is responsible for supplying most but not all of the circuits within the label, and in particular most of the circuits within the label control engine (LCE) 49.

For proper operation of the label circuit, however, the data within a limited number of circuits, and the operation of the reply rate oscillator within the label, must be maintained for the whole of the period at which the label may be insufficiently energised by one or more antennas. In the system as illustrated in FIG. 12 in which there are three antennas of which two may be badly coupled to the label, this period of time could be, as shown in FIG. 13, of duration 2 T. Such circuits are supplied by an auxiliary supply system (ASS) 50.

The auxiliary supply system producing the sustained supply voltage (SSV) shown can be realised in the form of a low threshold voltage series pass n-channel transistor residing in the a p-type substrate, feeding a reservoir capacitor whose capacitance is, in relation to the very low current drain of the circuits which need to be sustained thereby, sufficient for there to be in that supply only a small voltage drop over that period 2 T. Circuits which are fed from the sustained supply voltage are the reply interval oscillator (RIO) 51 and portions of the previously mentioned label control engine (LCE) 49.

In an n-well process the use of a series n-channel diode connected transistor allows the unsustained supply voltage (USV) across the following reservoir capacitor to be maintained despite the falling, during the brief periods of interruption of interrogator power for the purpose of signalling to the label, of the unfiltered rectifier voltage (URV), without the parasitic diodes which are always present in an integrated circuit fabrication process discharging the unsustained supply voltage (USV). In a similar manner, the use of an n-channel diode connected transistor in the auxiliary supply system (ASS) 50 will allow the preservation of the sustained supply voltage (SSV) after the unsustained voltage (USV) has fallen at the end of a period T of interrogator excitation, without parasitic diodes of the integrated circuit fabrication process discharging the sustained supply voltage (SSV).

The reply antenna system is also used to energise a programming voltage generator (PVG) 52. This block may consist of a charge pump which is clocked by the reply sub carrier signal (RSC) generated within a reply sub carrier oscillator (RSO) block 53 which will be discussed in more detail later. The programming voltage generator produces a programming output voltage (POV) which is fed to the label memory system (LMS) 54 and is used when the contents of an EEPROM within that system are to be changed. The label memory system is of straightforward design for a EEPROM memory and is controlled by a set of memory management signals (MMS) which contain when necessary programming data as well as programming control signals. When the memory is being read the label memory system provides memory data signals to the label control engine 49.

The principal function of the reply interval oscillator (RIO) 51 is to generate from the sustained supply voltage (SSV) a reply oscillator voltage (ROV) which may be of a rectangular wave form, and as already mentioned, may be of a frequency independent of the frequencies supplied to the label from the interrogator either in the form of the interrogation carrier or the interrogation modulation envelope. This function may be accomplished by use of cub-threshold currents to charge or discharge a reservoir capacitor, the transition points in the waveform being established by use of a very low current comparator, the output of which becomes the ROV waveform.

Circuits within the label control engine (LCE) 49 are shown in FIG. 17. At the left of the diagram is shown the excitation level generator (ELG) 54 which generates two signals, the reply threshold exceed (RTE) signal which determines whether the remainder of label circuit will come into operation, and the label excitation level (LEL) signal which becomes part of the reply waveform. The reply waveform is generated within the reply waveform generator (RWG) 55 by making use of the reply sub-carrier signal and the memory data signal, and feeding the appropriately combined result to the antenna tuning and modulation block 46 in the form of the modulation control signal (MCS).

The commencement of a reply occurs, as stated earlier, after the interrogation signal has produced a sufficient energisation for the label. When the interrogation signal is sensed by the label power up reset (PUR) circuit 56, that circuit will generate a general purpose reset (GPR) signal which is fed to a post reset sequencer (PRS) circuit 57 which is responsible for the generation of most of the sequences of operations which take place in the programming of a label or the generation of a label reply, and which will be discussed at greater length later.

In some circumstances, such as when the label has not been energised for a time significantly in excess (perhaps a multiple of 50) of the time T for which a single interrogation antenna is normally energised, the power up reset signal (PUR) block 56 also generates an inhibit reply reset (IRR) signal. The function of this reset signal is to provide that the behaviour of the isolated register block (IRB) 58 depends upon the amount of time for which the label has remained un-energised. More will be said about this block later. The different behaviours of the power up reset (PUR) circuit 56 are regulated by the (RSV) signal generated by reset control (RCS) system 59.

This circuit is powered by the unsustained supply voltage (USV) which charges a reservoir capacitor contained within the block, that capacitor being discharged by a controlled sub-threshold current. When the general purpose reset (GPR) signal is received from the power up reset (PUR) block 56, a comparison is made between the unsustained supply voltage and the voltage remaining on the aforementioned storage capacitor, the output of that comparison being the reset control voltage (RCV) which controls the operation of the power up reset (PUR) circuit 56 between its two modes.

Inputs to the command and data extraction (CDE) module 60 are the unfiltered rectifier voltage (URV) and the reply sub-carrier (RSC). It may be seen from FIG. 16 that the unfiltered rectifier voltage will fall close to zero within the brief interruptions of the interrogation signal which are shown in FIG. 14. The positioning and length of these signals can be used to extract commands and data from the interrogation signal being provided by the interrogator, those commands being reticulated to and regulating behaviour of the post reset sequencer (PRS) block 57.

The final block to be discussed in relation to FIG. 17 is the reply interval controller (RIC) 61. The principal interactions of this block are with the reply interval oscillator (RIO) block 51 and the isolated register (IRB) block 58. It is noted that both of the latter blocks are powered by the sustained supply voltage (SSV) discussed earlier. Their operation will then proceed independently of and despite the absence of the unsustained supply voltage (USV).

Figure 18:
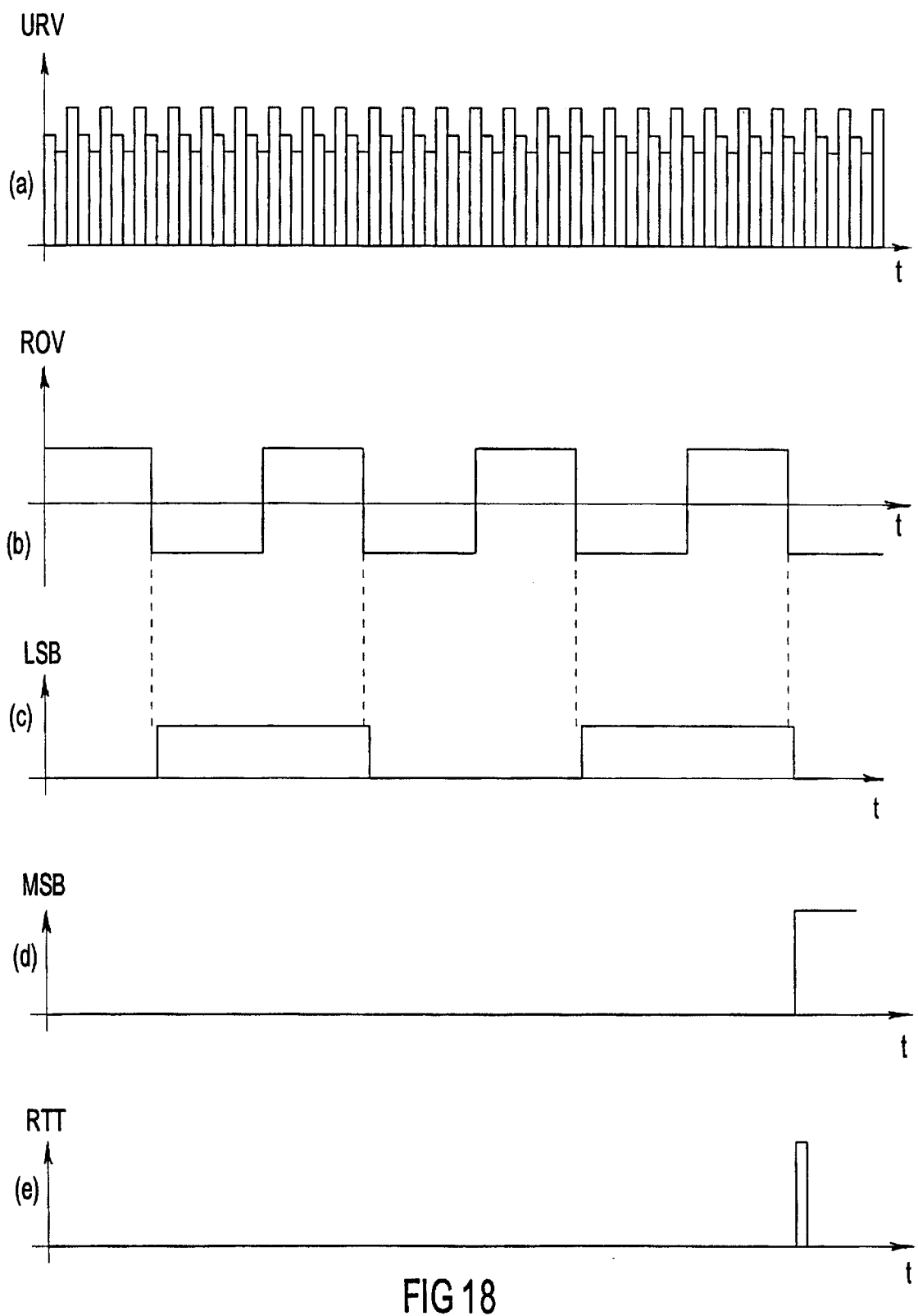
FIG. 18 shows various waveforms present in a label circuit.

The operation of these blocks is illustrated by means of FIG. 18, which shows a number of waveforms existing within the label circuit. The waveform at (a) is the unsustained rectifier voltage (URV) which remains substantially constant for each interval T, but which varies between adjacent intervals.

Independently of these variations the reply oscillator voltage (ROV) is shown as waveform (b). It is notable that the period of this oscillation is large compared with the period T, and in consequence it will become clear in the discussion below that labels will reply intermittently with the interval between replies from a single label being substantially greater than the time taken for one reply.

The reply oscillator voltage (ROV) may be fed both to the isolated register block (IRB) 58 and the reply interval controller (RIC) 61. The functions of those two blocks are highly intertwined; the reason they have been shown separately is that some of the sub-circuits are sustained by the sustained supply voltage (SSV) while others may merely be energised by the unsustained supply voltage (USV).

So that in response to interrogator commands a variation in the interval between replies from a single label may be effected, the oscillations in the reply interval oscillator (RIO) 51 do not directly control the appearance of replies from the label, but do so via a counter within the (IRB) block 58, the state of that counter being sustained, in the periods between interrogations by a single antenna, by the sustained supply voltage (SSV). A data selector within either the IRB block 58 or the RIC block 61 may be used to select one of the outputs of that counter as the controlling signal for the issuing of a reply. Various counter outputs such as the least significant bit (LSB) and most significant bit (MSB) are shown as waveforms at (c) and (d) of FIG. 18 respectively. When the counter has reached its terminal count as determined by the selected counter output, the reply interval controller (RIC) 61 generates, provided it has not been inhibited by the mechanisms below, a reply this time (RTT) signal, which is fed to the reply waveform generator (RWG) 55. The reply this time signal is shown as waveform (e) of FIG. 18.

One of the techniques in minimising current drain on the sustained supply voltage (SSV) is to ensure that transistors in the circuits which are connected thereto change state as far as possible only at times when the unsustained supply voltage (USV), from which the sustained supply voltage is replenished, is available. Although transitions in the reply oscillator voltage may occur at any time, transitions consequent upon those, such as occur within the counter of the reply interval timing system described above, may be restricted to occur during periods at which the label is energised, by gating the reply oscillator voltage signal with the general purpose reset (GPR) signal before it is presented to that counter.

When the reply this time (RTT) signal is generated, the aforementioned counter is reset. At the conclusion of the complete interrogator excitation period which follows the setting of the reply this time (RTT) latch, that latch is reset.

The reply this time (RTT) signal is not however always issued when the aforementioned counter reaches its terminal count. The reply this time (RTT) signal is gated with the output of latch also present in the isolated register block (IRB) 58. That latch is set as previously discussed in the disclosure when a match is found between the structured end of reply (SER) signal and label excitation level (LEL) bits in response to an interrogation of a label, and is reset shortly thereafter if a decoding error is received. In this way labels fall silent at the end of an interrogation period. Because the data which records the fact that a label has fallen silent is contained within a latch which is supported by the sustained supply voltage (SSV), the retention of the information will therefore survive the periods of up to 2 T between excitations from the single antenna, and thus for the entire period for which all labels are interrogated until none are any longer replying.

The overall operation of these circuits is such as to ensure that despite the fact that some antennas may not energise the label, replies from all labels can be successfully extracted, even when they are identically coded.

In the correct operation of the system for the eventual separation of label replies, it is important that the interval between label replies varies from label to label. When the interrogation signal is pulsed as described above, it is important that the period of the reply interval oscillator remains independent of any timing defined by energising of the interrogation antennas, so that the condition in which the reply intervals of two labels become synchronised to timing defined by the interrogation operation, and so with one another, does not occur.

According to another aspect of the invention, the pattern of energising of the interrogation antennas is not a periodic one, but varies in a random way either in the duration of the energising interval or in the intervals between energising, while still maintaining the requirement that none of the differently oriented interrogation antennas remains unenergised for a period longer than that for which the circuits supplied by the sustained supply voltage will maintain their correct operation. Possible variations in the pattern of interrogation antenna energising include insertion of periods, too short for the generation of a label reply, of energising one interrogation antenna between periods during which other interrogation antennas are energised for periods long enough for a label to generate a reply.

It is clearly desirable that the isolated register block be brought to an initial condition in which all labels will begin replying if the labels have been out of the field for a considerable time. This result is achieved by having the previously discussed inhibit reply reset signal (IRR) which is asserted if labels are powered up after the previously mentioned significantly high multiple (say 50) of the interrogation interval T. When this occurs the assertion of the (IRR) signal will ensure that the register containing the inhibit reply signal (IRS) is reset to zero, so that all labels reply as if from an initial condition in which they have never been interrogated.

One of the factors limiting the performance of electronic labelling systems which employ antennas resonant with capacitors formed within the associated microcircuit is the uncertainty of the resonant frequency associated with the manufacturing tolerances of such capacitors. There is also the fact that in operation the environment of the label produces changes to the effective inductance of the antenna. These two facts combine to change the resonant frequency of the antenna circuit away from its design value. The result is a loss of sensitivity of the label, particularly as the modulation process produces further, time varying, shifts in the resonant frequency.

According to another aspect of the invention an automatic label antenna tuning system has been implemented to address these problems. During the first part of the interrogation cycle, ie during that part before possible appearance of command signals from the interrogator, the label control engine (LCE) 49 sends tuning control signals (TCS) to the antenna tuning and modulation (ATM) system 46 so that the tuning capacitance attached to the antenna is incremented in steps from its lowest possible value. During this incrimination, the label control engine (LCE) 49 monitors the unsustained supply voltage (USV) and determines the set of capacitors which achieve the highest voltage level. The label control engine may then send further command signals to either increase or decrease the tuning capacitance from the value just determined, so that modulation process to be described below produces approximately equal shifts of the antenna resonant frequency above and below the interrogation frequency.

In the modulation process, the capacitance connected to the resonant antenna system (RAS) 45 is varied, while a reply is occurring, at the rate of the reply sub-carrier oscillator, with a phase dependent upon data supplied by a label flag generator, a label memory system, or the excitation level generator (ELG) 54. This form of modulation may be adjusted so that the excursion in resonant frequency of the resonant antenna system (RAS) 45 is less than the frequency bandwidth of that system, so that too great a variation in the voltage developed across that resonant system, with a consequent loss of sensitivity of the label to the energising field, does not occur. Although significant amplitude modulation of a current in the resonant antenna system does not occur, phase shifts of the current in that resonant circuit approaching an excursion of 90 degrees can be achieved. Phase sensitive detection of the signal reaching the interrogator receiver antenna will ensure that this reply is adequately detected. An advantage of the automatic antenna tuning system is that labels will perform with optimum sensitivity in a variety of environments.

Figure 19:
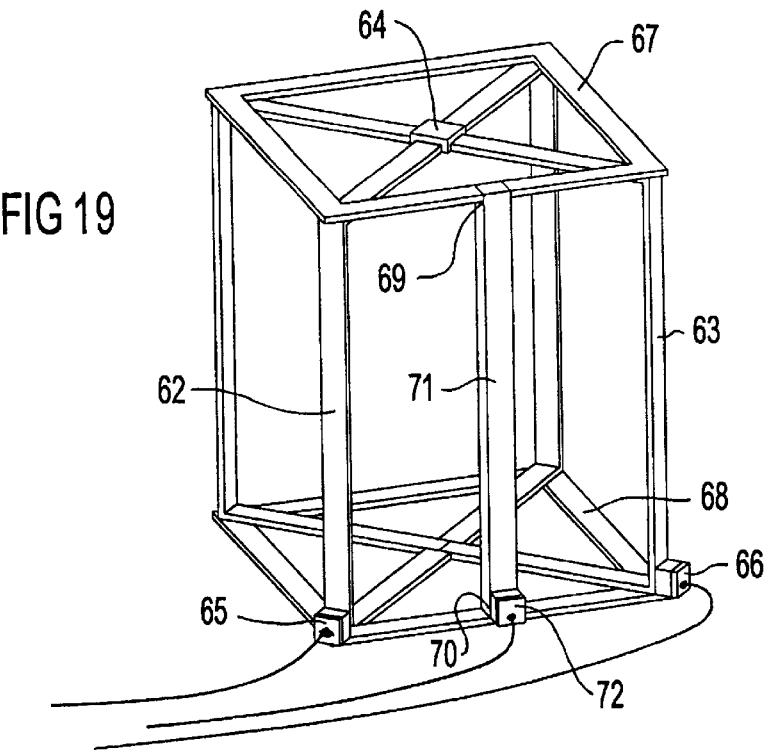
FIG. 19 shows an arrangement of three mutually uncoupled antennas for the creation of interrogation fields in three mutually orthogonal directions.

An arrangement of interrogator antennas suitable for the separate creation of interrogation fields is shown in FIG. 19.

Two of the antennas 62 and 63 consist of mutually orthogonal rectangular loops made from rectangular conducting tubes, each with a gap contained in a crossover and connection box 64 at the top centre of the loops at which feed points, resonating capacitors, damping resistors, and matching networks to 50 ohm transmission lines are established. From those feed points 50 ohm coaxial cables travel inside the tubes until they make exit at external connection points 65 and 66 which have cables leading to an antenna multiplexer within the interrogator.

The third antenna consists of a pair of square loops 67 and 68 made from rectangular conducting tubes with gaps at feed points 69 and 70. The loops are connected in parallel through cables placed in rectangular connecting tube 71 and collectively tuned and matched to a 50 ohm transmission line by capacitor and resistor components placed inside external connection box 72 from which point a coaxial connection to the antenna multiplexer of the interrogator is made. A feature of this structure is that two of the loops are planar and intersect at an angle, the line of intersection falling within the interrogation region.

Advantages of using an antenna configuration of the form shown are that the three antennas are not mutually coupled by the electromagnetic fields which they create, and in consequence the individual tuning operations are simplified and the field configurations generated are assured through being readily predictable; the three mutually orthogonal fields each couple strongly to suitably oriented labels; a label of any arbitrary orientation will couple strongly to at least one of the antennas; there is a clear pathway, in the diagram in a transverse direction, along which objects may travel so that they pass through the interior of the loops of two of the antennas, and travel through a strong field region of the third, all without interference from any of the antenna structures; each of the four loops has but a single turn, and thus problems of non-uniform current distribution and thus enhanced far field radiation, which can arise from such non-uniform current distribution, particularly at an operating frequency in the hf band, are minimised.

It will be appreciated that various alterations, modifications and/or additions may be introduced into the constructions and arrangements of parts previously described without departing from the spirit or ambit of the present invention.

What is claimed is:

1. A label reading system including:
   an interrogator including a transmitter for generating an interrogation signal and a receiver for detecting and decoding a reply signal;
   an interrogation field creation means including a transmitter antenna connected to said transmitter for generating from said interrogation signal an electromagnetic interrogation field through which an object possessing a code responding label may pass;
   said code responding label including a label receiving antenna for receiving from said interrogation field a label interrogation signal, means for generating label reply signals and means for generating from said label reply signals an electromagnetic reply field;
   said label reply signals being generated intermittently by the label at intervals which are timed within the label;
   said code responding label further including means for detecting a label excitation level provided by said interrogation field at said label, and means for providing an encoded indication of said label excitation level in said label reply signals;
   a receiver antenna connected to said receiver for receiving said reply signals from said reply field;
   said receiver including means for detecting starting and stopping times of said reply signals; and
   said interrogator providing a timing signal to the labels upon detecting that a reply signal or an overlapping series of reply signals has just ceased.

2. A label reading system according to claim 1 wherein a plurality of labels is simultaneously present in the interrogation field.

3. A label reading system according to claim 2 wherein said timing signal to the labels acts as a time marker in terms of which subsequent signals to labels are interpreted by said labels.

4. A label reading system according to claim 3 wherein said timing signal becomes part of a structured end of reply signal containing additional information.

5. A label reading system according to claim 4 wherein said additional information includes the encoded indication of said label excitation level that was present in the label reply most recently received by said receiver.

6. A label reading system according to claim 1 wherein said intermittent generation of replies by a label is suspended within a label that receives an end of reply signal from the interrogator a predetermined time after completing its reply.

7. A label reading system according to claim 7 wherein said suspension takes place before the reply signal from the label has been decoded by the interrogator.

8. A label reading system according to claim 4 wherein the label stores the last label excitation level detected by that label.

9. A label reading system according to claim 8 wherein said intermittent generation of replies by a label is suspended by a label which receives a structured end of reply signal containing an encoded label excitation level which matches the label excitation level stored in the label.

10. A label reading system according to claim 4 wherein command signals to the labels, signals transmitted after an end of reply signal, or signals transmitted within a structured end of reply signal vary characteristics of the label reply signal.

11. A label reading system according to claim 10 wherein said characteristics include duration and timing of the label reply signal, spacing between successive label reply signals, ceasing transmission of a label reply signal, resuming transmission of a label reply signal and adopting a predetermined initial condition.

12. A label reading system according to claim 1 wherein a signal transmitted after an end of reply signal indicates successful decoding within said interrogator of said reply signal.

13. A label reading system according to claim 1 wherein a signal transmitted after an end of reply signal indicates unsuccessful decoding within said interrogator of said reply signal.

14. A label reading system according to claim 13 wherein an unsuccessful decoding signal causes the label which has just completed its reply to resume intermittent generation of replies.

15. A label reading system according to claim 2 wherein a label is adapted to draw energy from said interrogation field.

16. A label reading system according to claim 11 wherein said interrogator includes means for recording an average proportion of time for which labels reply signals are detected compared with a time for which no label reply signals are detected.

17. A label reading system according to claim 13 wherein said interrogator includes means for comparing a duration during which a label reply signal or an overlapping sequence of label reply signals is detected with a known duration of a single label reply signal.

18. A label reading system according to claim 13 wherein said labels encode their replies by phase modulation of a sub-carrier signal, said interrogator includes means for analyzing, during each interval in which a label reply signal is detected, variation in amplitude of the recovered label reply sub-carrier signal, and a judgment of correct decoding made by said interrogator requires that said variation in amplitude does not exceed a predetermined value.

19. A label reading system according to claim 1 in which the end of reply signal is achieved via a substantial reduction in amplitude of said interrogation signal for a time which is short relative to the energy storage time of a circuit contained in the associated code responding label.

20. A label reading system according to claim 1 wherein the label includes DC energy storage means for sustaining operation of the label between periods of reduction of the interrogation power supply signal, said operation including transfer of information from the interrogator to the label.

21. A label reading system according to claim 20 wherein the label includes further DC storage means, and volatile but relatively low power consuming information storage circuits, which preserve information generated during operation of the label, and in particular whether or not it has ceased to offer its intermittent replies, and the information defining the interval at which those replies are offered, for a period which is greater than the duration of several complete label reply signals, even if no interrogator power is available therein.

22. A label reading system according to claim 1 wherein said interrogation field creation means includes a plurality of transmitter antennas, said transmitter antennas being arranged to create in one region a plurality of spatial directions of magnetic field and wherein two of the transmitter antennas are in the form of loops which intersect at an angle along a line of intersection falling within the interrogation field.

23. A label reading system according to claim 1 wherein said interrogation field creation means includes a plurality of transmitter antennas, each one of said plurality of antennas being connected to set the transmitter for a time sufficient for receiving just one label reply signal.

24. A label reading system according to claim 23 wherein a plurality of antennas is connected to said transmitter in a sequence which is varied to avoid synchronism between the interval between offerings of a label reply signal with an interval which establishes the cycle of connection of the interrogation antennas.

25. A label reading system according to claim 1 wherein said label receiving antenna forms part of a resonant circuit having a resonant frequency which is adjusted in response to an interrogator command.

26. A label reading system including:
an interrogator including a transmitter for generating an interrogation signal and a receiver for detecting and decoding a reply signal;
an interrogation field creation means including a transmitter antenna connected to said transmitter for generating from said interrogation signal an electromagnetic interrogation field through which an object possessing a code responding label may pass;
said code responding label including a label receiving antenna for receiving from said interrogation field a label interrogation signal, means for generating a label reply signal and means for generating from said label reply signal an electromagnetic reply field;
a receiver antenna connected to said receiver for receiving said reply signal from said reply field; and
said interrogation field creation means including a plurality of interrogation transmitter antennas, said interrogation transmitter antennas being connected to said transmitter in sequence and the sequence in which the plurality of interrogation transmitter antennas is connected to said transmitter being varied to avoid synchronism between the interval between offerings of a label reply signal with an interval which establishes the cycle of connection of the interrogation transmitter antennas.

27. A label reading system according to claim 26 wherein the sequence in which the plurality of antennas is connected to said transmitter is varied in a substantially random manner.

28. A label reading system including:
an interrogator including a transmitter for generating an interrogation signal and a receiver for detecting and decoding a reply signal;
an interrogation field creation means including a transmitter antenna connected to said transmitter for generating from said interrogation signal an electromagnetic interrogation field through which an object possessing a code responding label may pass;
said code responding label including a label receiving antenna for receiving from said interrogation field a label interrogation signal, means for generating a label reply signal and means for generating from said label reply signal an electromagnetic reply field;
a receiver antenna connected to said receiver for receiving said reply signal from said reply field; and
said interrogation field creation means including a plurality of transmitter antennas, said transmitter antennas being arranged to create in one region a plurality of spatial directions of magnetic field and two of the transmitter antennas being in the form of loops which intersect at an angle along a line of intersection falling within the electromagnetic interrogation field.

* * * * *